US006684117B2

(12) United States Patent
Bacin et al.

(10) Patent No.: US 6,684,117 B2
(45) Date of Patent: Jan. 27, 2004

(54) METHODS AND SYSTEMS FOR SCHEDULING WORK

(75) Inventors: Edson Bacin, Curitiba (BR); Claudio Nogueira de Meneses, San Paulo (BR); Pedro Sergio de Souza, Marietta, GA (US); Ivan Roquete Macedo, Cambui Campinas (BR); Wesley Elias Ribeiro, Jd. Proenca Campinas (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/428,478

(22) Filed: May 2, 2003

(65) Prior Publication Data

US 2003/0195648 A1 Oct. 16, 2003

Related U.S. Application Data

(63) Continuation of application No. 09/540,064, filed on Mar. 31, 2000.

(51) Int. Cl.[7] .............................................. G06F 19/00
(52) U.S. Cl. ............................ 700/98; 700/109; 705/28
(58) Field of Search ......................... 700/99–100, 106, 700/115, 107, 109; 705/7–10, 11, 28

(56) References Cited

U.S. PATENT DOCUMENTS

| 5,402,350 A | * | 3/1995 | Kline ........................ 700/101 |
| 5,479,343 A | * | 12/1995 | Matoba et al. ............. 700/106 |
| 5,950,170 A | * | 9/1999 | Pan et al. ...................... 705/7 |
| 6,201,999 B1 | | 3/2001 | Jevtic ......................... 700/100 |
| 6,226,561 B1 | | 5/2001 | Tamaki et al. ............... 700/99 |
| 6,278,901 B1 | | 8/2001 | Winner et al. ............. 700/100 |
| 6,311,094 B1 | | 10/2001 | Iriuchijima et al. ......... 700/100 |

FOREIGN PATENT DOCUMENTS

| AU | 199959658 B2 | 7/1999 |
| DE | 198 32 762 A1 | 7/1998 |

OTHER PUBLICATIONS

Lee, H.s., et al. , (1996) "primary production scheduling at steelmarking industries" IBM J. Res. Develop., vol. 40, No. 2.*
Production Planning and Scheduling, Functional Architecture, Itabira Special Steels Co., ACESITA, IBM Applied Manufacturing Technologies, Atlanta, USA/Brazil, Jun. 1996.

* cited by examiner

Primary Examiner—Leo Picard
Assistant Examiner—Kidest Bahta
(74) Attorney, Agent, or Firm—Scully, Scott, Murphy & Presser; William E. Schiesser

(57) ABSTRACT

In a first aspect, the present invention provides a unique algorithm that interactively takes into consideration the melt shot (MS) and the hot strip mill (HSM) constraints such that a balanced and feasible solution is reached for the whole Primary Area (MS and HSM) at once. In a second aspect, the invention takes a set of orders defined to be produced next in the Melt Shop area in a steel mill and groups them in small sets of orders with similar characteristics, called heats. Each order belongs to a heat. The system defines the precise moment that each heat has to be processed in each of its steps. In another aspect, the invention uses an event-driven based algorithm as a general approach for scheduling all the processing units with their specific constraints and the metallic units from hot coils to the finished products at the shipping areas.

20 Claims, 18 Drawing Sheets

METHODS AND SYSTEMS FOR SCHEDULING WORK

This application is a continuation of application Ser. No. 09/540,064, filed Mar. 31, 2000.

BACKGROUND OF THE INVENTION

This invention generally relates to systems and procedures for developing work schedules. More specifically, the invention relates to systems and procedures for developing schedules for the steel manufacturing industry.

Usually, in a steel mill, a planning system defines what orders are to be produced next in a given plant. In a flat rolling steel mill, raw material is melted in pig iron that receives several alloys, which produces steel. Ladles of melted steel go through vacuum and purification processes until the final metallurgical specification is reached. Finally, the melted steel is poured into slabs. All of these steps happen in the Melt Shop (MS) Area. The next step in the process is the slab rolling operation in the Hot Strip Mill (HSM) Area. A slab can be rolled in several hot coil dimensions. Each of these two areas has its own constraints and objectives that are conflicting. For example: the MS wants to produce all the heats with the same cast grade in a row, which would produce a flat distribution of slabs regarding width. However, the HSM wants to roll slabs with a monotonic decreasing width sequence. Clearly, both are conflicting constraints.

Other areas of a steel mill present their own scheduling challenges. For example, the Finishing Area for a Steel Mill includes all the remaining production processes that start with hot coils and end with any finished product ready for shipping. The most important characteristic of the Finishing Area from the scheduling point of view is that the processing units are not tightly coupled. This means that a metallic unit (i.e., coil, blanket, sheet, . . . ) can wait for an indefinite period of time before going to the next processing unit. Another important feature about the Finishing Area is that each processing unit has its own set of constraints and rules to sequencing the metallic units for processing.

In addition, the Melt Shop area usually produces slabs that are rolled by the Hot Strip Mill (HSM) area, producing hot coils. A HSM area can include grinders, furnaces, and mills. Each slab has its own route through the HSM area, depending upon its cast grade, current dimensions, hot coil dimensions and order specifications.

SUMMARY OF THE INVENTION

An object of this invention is to improve scheduling procedures for steel mills.

Another object of the present invention is to provide a procedure for scheduling small sets of orders with similar characteristics, called heats, in a steel mill.

A further object of this invention is to provide an efficient solution for the finishing area scheduling problem for the steel industry.

Still another object of this invention is to provide an improved hot strip mill scheduling procedure.

A further object of the present invention is to provide a solution that interactively takes into consideration the melt shop (MS) area and the hot strip mill (HSM) area constraints such that a balanced and feasible solution is reached for the whole Primary Area (MS and HSM) at once.

These and other objectives are attained with the systems and procedures disclosed herein. In a first aspect, the present invention provides a unique algorithm that interactively takes into consideration the MS and the HSM constraints such that a balanced and feasible solution is reached for the whole Primary Area (MS and HSM) at once. In a second aspect, the invention takes a set of orders defined to be produced next in the Melt Shop area in a steel mill and groups them in small sets of orders with similar characteristics, called heats. Each order belongs to a heat. Each heat has a route that describes the production steps (processing units) that the heat has to go through in the Melt Shop. The system defines the precise moment that each heat has to be processed in each of its steps. Also, preferably the system considers restrictions such as temporal restrictions, raw material availability and ladle contamination. As output, the system provides the schedule of each processing unit and the instant that the slabs and ingots are created at the continuous casters.

In another aspect, the invention uses an event-driven based algorithm as a general approach for scheduling all the processing units with their specific constraints and the metallic units from hot coils to the finished products at the shipping areas. The system considers not only the material available at the execution moment, but also the material that will become available for every processing unit as time goes by. With a further aspect, the present invention provides a system that considers various constraints and assigns a precise start and finish time for each slab to be processed in each processing unit specified in the slab route. As its primary output, the system provides the exact moment the hot coils become available for the finishing area. The system provides a full set of intervention functions in the case that the user wants to adjust any aspect of the solution.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

As mentioned above, usually, in a steel mill, a planning system defines what orders are to be produced next in a given plant. In a flat rolling steel mill, raw material is melted in pig iron that receives several alloys, which produces steel. Ladles of melted steel go through vacuum and purification processes until the final metallurgical specification is reached. Finally, the melted steel is poured into slabs. All of these steps happen in the Melt Shop (MS) Area. The next step in the process is the slab rolling operation in the Hot Strip Mill (HSM) Area. A slab can be rolled in several hot coil dimensions. Each of these two areas has its own constraints and objectives that are conflicting. For example: the MS wants to produce all the heats with the same cast grade in a row, which would produce a flat distribution of slabs regarding width. However, the HSM wants to roll slabs with a monotonic decreasing width sequence. Clearly, both are conflicting constraints. This invention provides a solution to interactively take into consideration the MS and the HSM constraints such that a balanced and feasible solution is reached for the whole Primary Area (MS and HSM) at once.

The algorithmic logic underneath the system is based upon an Asynchronous Team architecture. An Asynchronous Team (A-Team) is an architecture where multiple agents cooperate with one another to solve a given problem with a better solution than any of the agents can find by itself. The A-Team used in a preferred implementation of this illustrated in FIG. 1. FIG. 2 shows an algorithm for scheduling operations in a steel mill that may be implemented using the architecture of FIG. 1.

Figure 1:
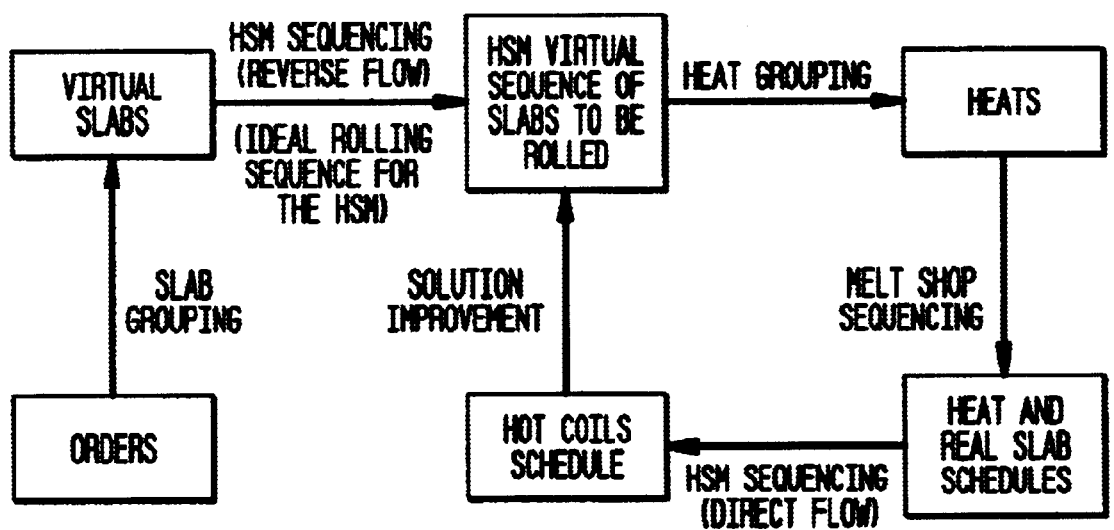
FIG. 1 illustrates an asynchronous team architecture that may be used in the practice of this invention.
Figure 2:
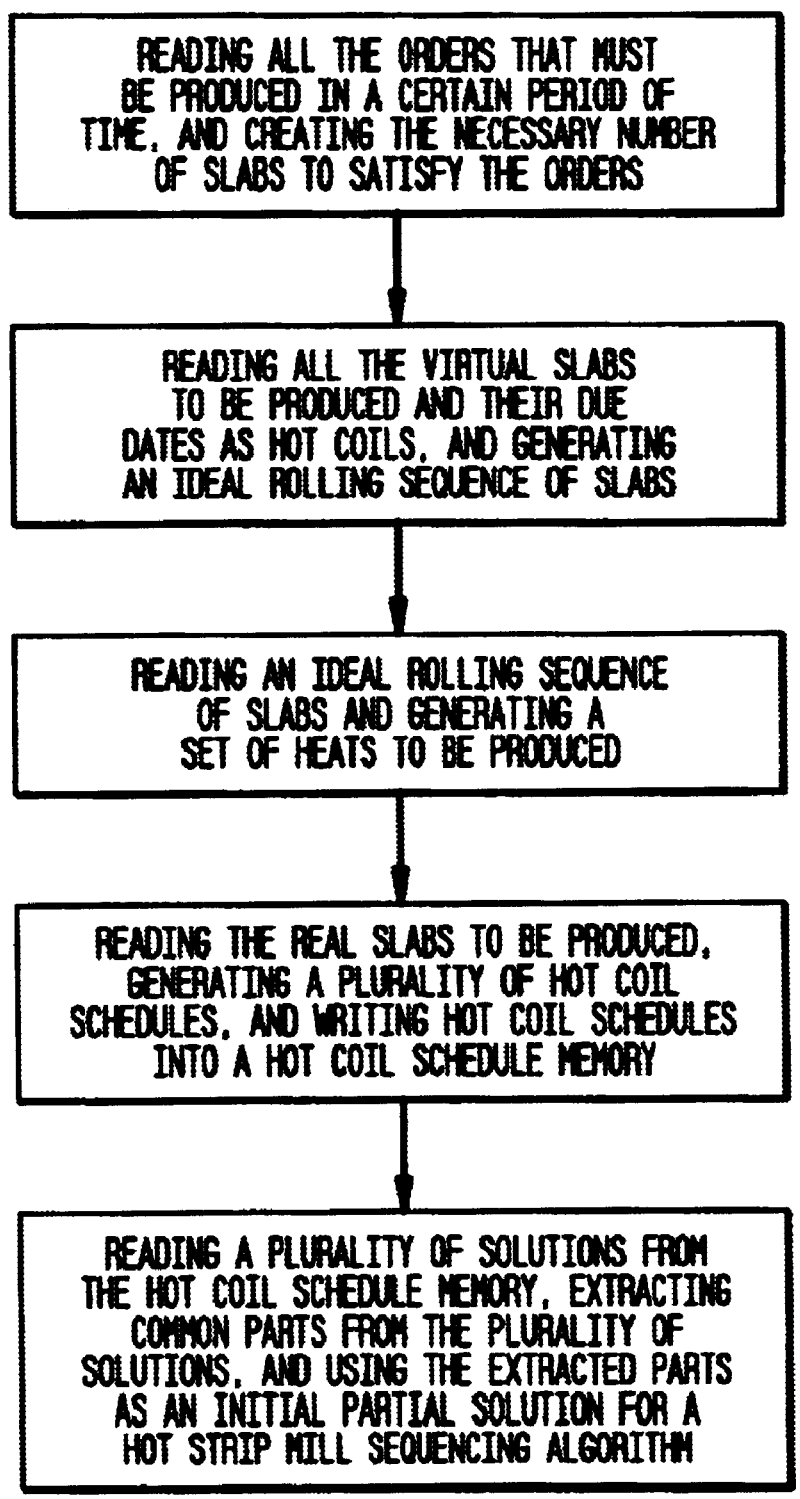
FIG. 2 shows an algorithm, that may be implemented using the architecture of FIG. 1, for scheduling operations in a steel mill.

In FIG. 1, the arrows are the algorithms and the rectangles are the shared memories. The algorithms read from the memory at their tail, generates an output and write it in the memory at their heads. Each shared memory holds one or more instances of the data that it is responsible to have. A description of each algorithm follows:

Slab Grouping Algorithm: It reads all the orders that must be produced in a certain period of time and creates the necessary number of slabs to satisfy the order. All the constraints regarding dimensions and weight are considered. The output is the number of slabs and their specification as well.

HSM Sequencing Algorithm (Reverse Flow): It reads all the virtual slabs to be produced and their due dates as hot coils. Then, the algorithm generates the ideal rolling sequence of slabs considering all the constraint of the HSM area and disregarding any possible constraint of the Melt Shop. This ideal sequence is written in the HSM Sequence of Virtual Slabs to Be Rolled memory. It is called reverse flow, for it generates a sequence of slabs from the HSM to the MS area.

Heat Grouping Algorithm: It reads an ideal rolling sequence (it may be more than one) of slabs and creates heats considering constraints such as heat weight, slab weight, orders cast grades, cast grade similarity, slab due date at the HSM and time window to pour each slab (some cast grades deteriorates with time and the synchronism with the HSM is critical). As output, it generates a set of heats to be produced by the Melt Shop and write it in the heats memory.

Melt Shop Scheduling Algorithm: It reads a set of heats to be produced and sequence them through the Melt Shop maximizing throughput, caster string quality, tardiness regarding the HSM due dated for the slabs, and several timing and process constraints. The output is a schedule of heats and real slabs to be produced by the MS and is written in the Heat and Real Slab Schedule memory.

HSM Sequencing Algorithm (Direct Flow): It reads the real slabs to be produced and also what has been produced by the MS and creates a new rolling sequence for the HSM considering all the constraints for the HSM, and also the MS slab availability as a hard one. The output is a hot coil schedule that is written in the Hot Coils Schedule memory. It is called direct flow, for it generates a rolling sequence of slabs from the MS to the HSM area.

Solution Improvement Algorithm: It reads two solutions from the Hot Coils Schedule Memory and extracts common parts from both solutions. The extracted parts are used as initial partial solution for the HSM Sequencing Algorithm embedded in here. This algorithm fills the missing slabs of a complete solution. The output of the solution Improvement Algorithm is written in the HSM Sequence of Virtual Slabs to Be Rolled memory.

All the algorithms run freely for some period of time during which several solutions are deposited in the Hot Coils Schedule Memory. From the set of solutions, the best available pareto layer is presented to the user from which he will choose one to be sent to the plant after an intervention phase, if necessary.

The system is composed by a graphical interface with several screens (Windows '95) where the user can:

edit the data originated by the Plant Floor Operation System that reflects what the plant has been done.

edit and fix the near future part of the solution about to be created, given that the plant can not react to sudden changes that would happen in less than a few hours.

run the A-Team and choose a candidate solution to be sent to the plant.

call the intervention screens for the Melt Shop Algorithms and for the HSM Sequencing Algorithm to intervene in the chosen solution.

The graphical interface communicates with the A-Team server under UNIX, through MQSeries communication package. The server interfaces with the database (Oracle) and runs the algorithms, sending back the output to the interface and database.

Another aspect of the invention addresses a problem referred to as the Job Shop Problem. This aspect of the invention takes a set of orders defined to be produced next in the Melt Shop area in a steel mill and group them in small sets of orders with similar characteristics, called heats. Each order belongs to a heat. Each heat has a route that describes the production steps (processing units) that the heat has to go through in the Melt Shop. The system defines the precise moment that each heat has to be processed in each of its steps. Also, the system considers restrictions such as temporal restrictions, raw material availability and ladle contamination. As output, the system provides the schedule of each processing unit and the instant that the slabs and ingots are created at the continuous casters.

Figure 4:
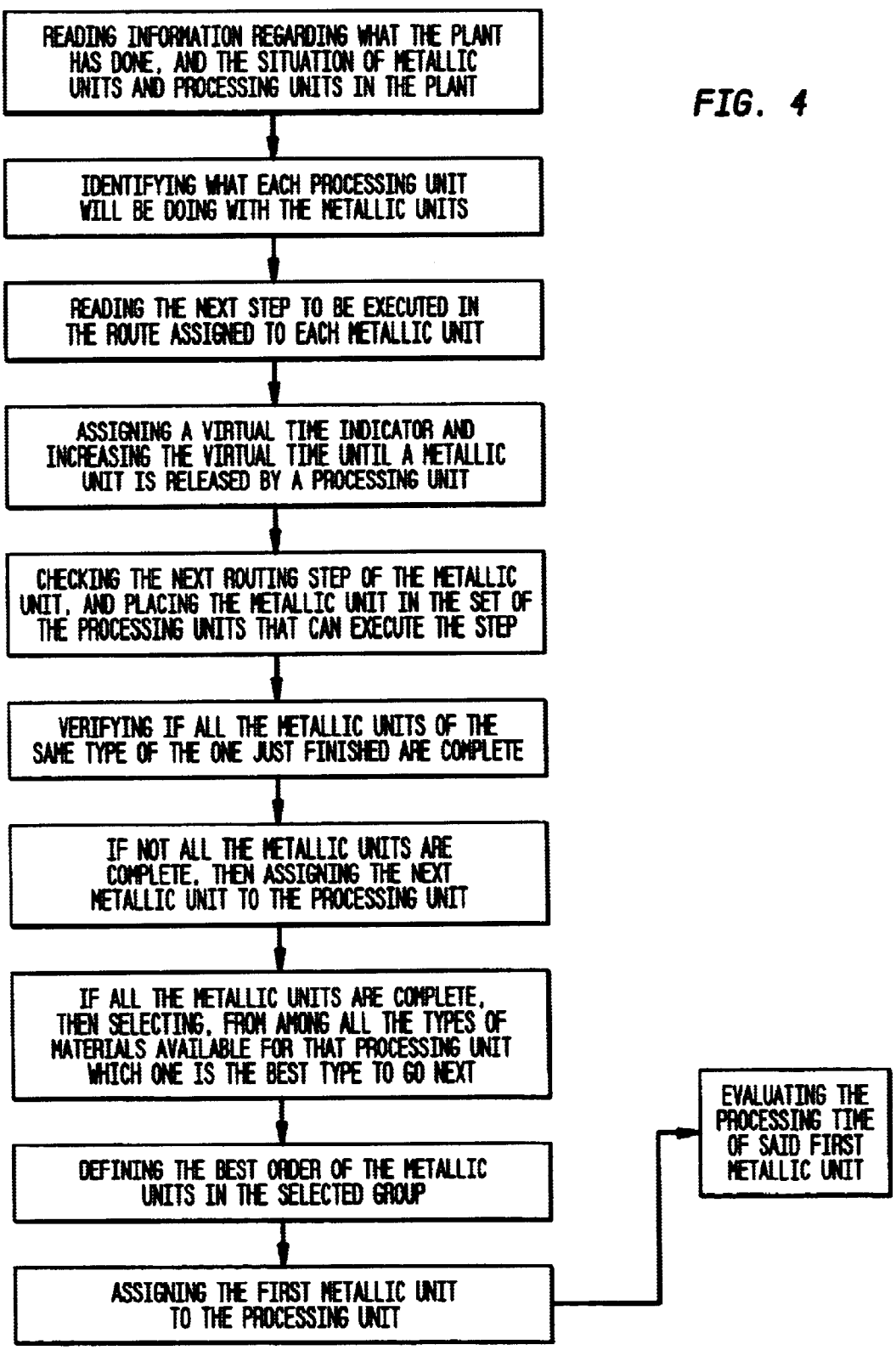
FIG. 4 shows an algorithm that addresses the finishing area scheduling problem for the steel industry.

FIG. 4 shows a preferred search algorithm. With reference to this Figure, after grouping the orders, the algorithm creates a reference order for the heats from where heats are pulled to be scheduled. The algorithm starts with the current plant condition and tests the best value of the objective function for taking B possible heats to be schedule next. It forms sequences up to P heats to be scheduled in order (B and P are internal parameters). After testing approximately B**P (B to the power of P) possibilities, the algorithm takes the best sequence from where it fixes the first heat of the sequence as scheduled, which defines a new current condition. The heat fixed as scheduled is removed from the reference list and the cycle restarts until all the heats are scheduled.

To schedule a heat means to assign a start and finish time to every route step in the processing unit that the step is supposed to be executed. To process a step, the process unit may request some extra piece of equipment, for example a specific ladle. The algorithm schedules the ladle through the available furnaces to make it ready at the right temperature to receive the hot material at the exact moment to be processed. All transportation times, contamination constraints, equipment processing time, cast grades restrictions and a myriad of other restrictions are considered. By using this system, a Melt Shop can be completely scheduled with a horizon of days with minor intervention needed by the user. The system also provides a complete set of functions to the user to perform any change in the system solution, if necessary.

The system consists of a graphical interface with several screens (Windows'95) where the user can assign orders to heats, schedule/change/remove heats, assign/change ladles, change heat route and change default values for all the restrictions. The graphical interface communicates with a server (UNIX) through sockets. The server interfaces with the database (Oracle) and runs the algorithm, sending back to the interface and database the output.

In accordance with a further aspect of the invention, a procedure and system are provided for addressing hot strip mill scheduling problems. As mentioned above, a hot strip mill (HSM) area can be comprised of grinders, furnaces and mills. Each slab has its own route through the HSM area, depending upon its cast grade, current dimensions, hot coil dimensions and order specification. This aspect of the invention considers all of these constraints with several others and assigns a precise start and finish time for each slab to be processed in each processing unit specified in the slab route. As its primary output, the system provides the exact moment the hot coils become available for the finishing area. The system provides a full set of intervention functions in the case that the user wants to adjust any aspect of the solution.

More specifically, there are three major classes of constraints one has to face to generate a schedule for a HSM area: timing constraints, set-up constraints, and due date constraints.

Timing constraints result from the fact that most of the slabs have a time window in which the slab must be processed. Otherwise, it becomes scrap. Set-up constraints are due to the fact that all processing units in the HSM area have hard set-up constraints that must not be violated to assure a desirable quality in the hot coils. However, following those constraints reduces dramatically the rolling productivity. Therefore, a sequence of slabs to be rolled has to be carefully created to get the most out of the machinery.

Due date constraints are not a hard constraint; however, it is imperative that the hot coil due dates be followed, since the HSM usually feeds several finishing lines. A delay in the HSM area may shut down one or more finishing lines with delay of orders to the customers and unnecessary start-up constraints to the finishing lines, especially regarding the furnaces.

On the top of these constraints, the system considers special constraints for each processing unit, such as furnace throughput rate depending upon the cast grade of the slabs being heated, rolling cylinder life cycle, gauge productivity, decreasing slab width for each rolling cylinder, relative physical slab position in a stack of slabs to be rolled, interlaced rolling of two sequences of slabs with distinct routes through the rougher (type of equipment), minimum and maximum lot size for critical route steps, and pre/pos maintenance period constraints.

Figure 5:
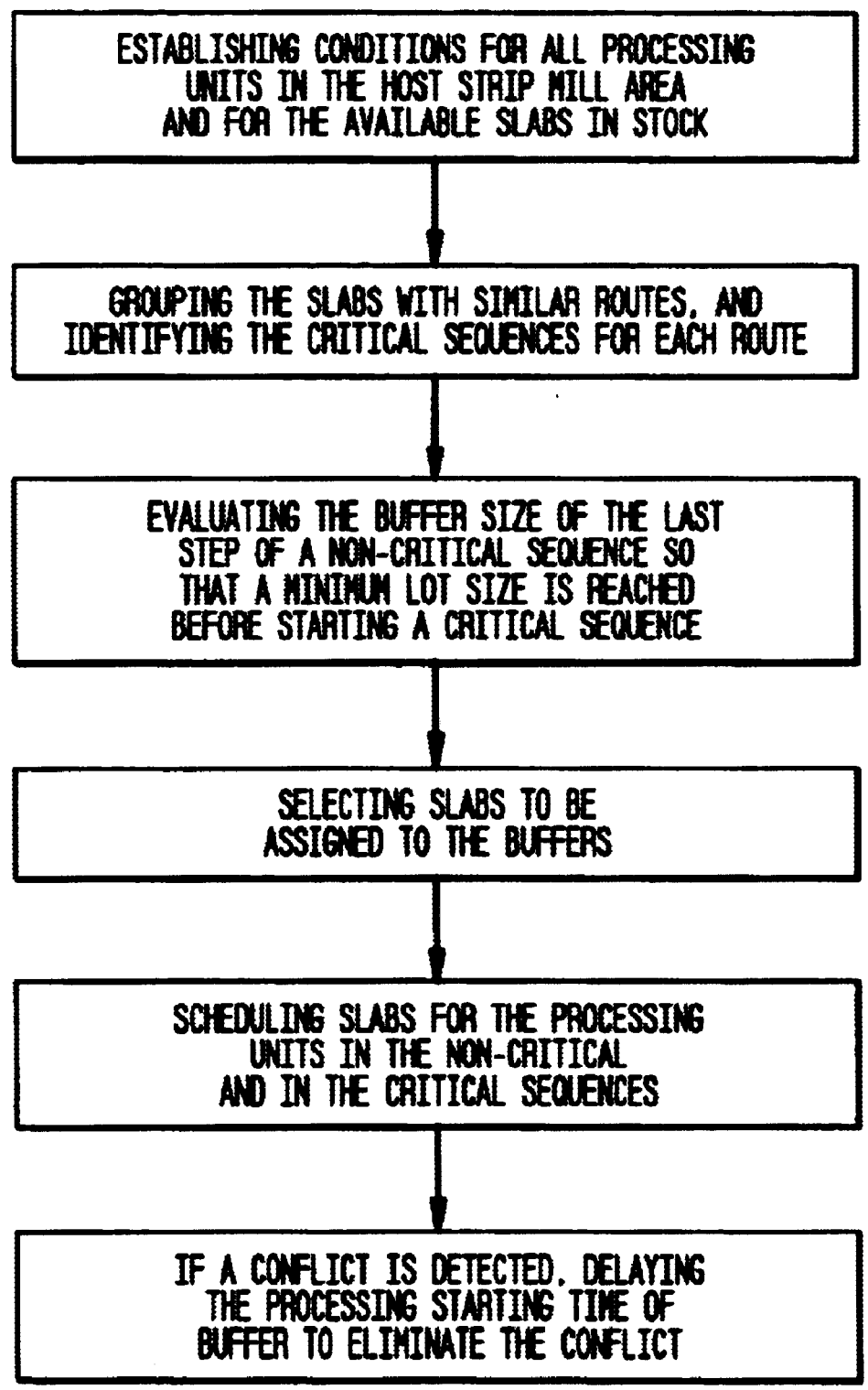
FIG. 5 is a flow chart showing a preferred procedure for solving the hot strip mill scheduling problem for the steel industry.

FIG. 5 is a flow chart showing a preferred procedure for implementing this aspect of the invention. As shown in this Figure, the initial condition for the algorithm is defined by the data coming from the plant floor. It establishes the conditions for all processing units in the HSM area and the available slabs in stock. Other information, such as cylinder life cycle, furnace temperature, slabs in the furnaces are also provided by the plant floor. Then, the algorithm groups the slabs with similar routes and identifies the critical sequences for each route. A critical sequence is a sequence of operations that has no wait time in-between any two operations. The route information brings data indicating pairs of operations with such characteristic. The algorithm, then, evaluates the buffer size of the last step of a non-critical sequence so that a minimum lot size is reached before starting a critical sequence. After selecting the slabs to be assigned to the buffers, the algorithm schedules the slabs for the processing units in the non-critical and in the critical sequences. If a conflict is detected, a delay at the processing starting time of buffer is evaluated so that the conflict is eliminated. This iterative process occurs until there is no conflict in the schedule solution.

As an output, the system provides the starting and finishing times that each slab is processed in each processing unit of its route. Also, it provides the moment that a hot coil becomes available to the Finishing Area. The system generates a schedule for the whole HSM area minimizing tardiness of the hot coils and maximizing hot charge index (that means, minimize time between the moment that a slab is produced and rolled).

The system consists of several screens for displaying and editing the solution and adjusting parameters. The graphical interface runs on Windows/95 and connects to a Unix based server that runs the bulk of the algorithm. The algorithm may interface with a Oracle database and with several other systems: Detailed Planning, Melt Shop, Material Reallocation, routing and Finishing Schedule. Inter system communication is made through MQ Series (IBM package).

Another aspect of the invention addresses the finishing area scheduling problem. This aspect of the invention uses an event-driven based algorithm as a general approach for scheduling all the processing units with their specific constraints and the metallic units from hot coils until the finished products at the shipping areas. The system considers not only the material available at the execution moment, but also the material that will become available for every processing unit as time goes by.

Figure 3:
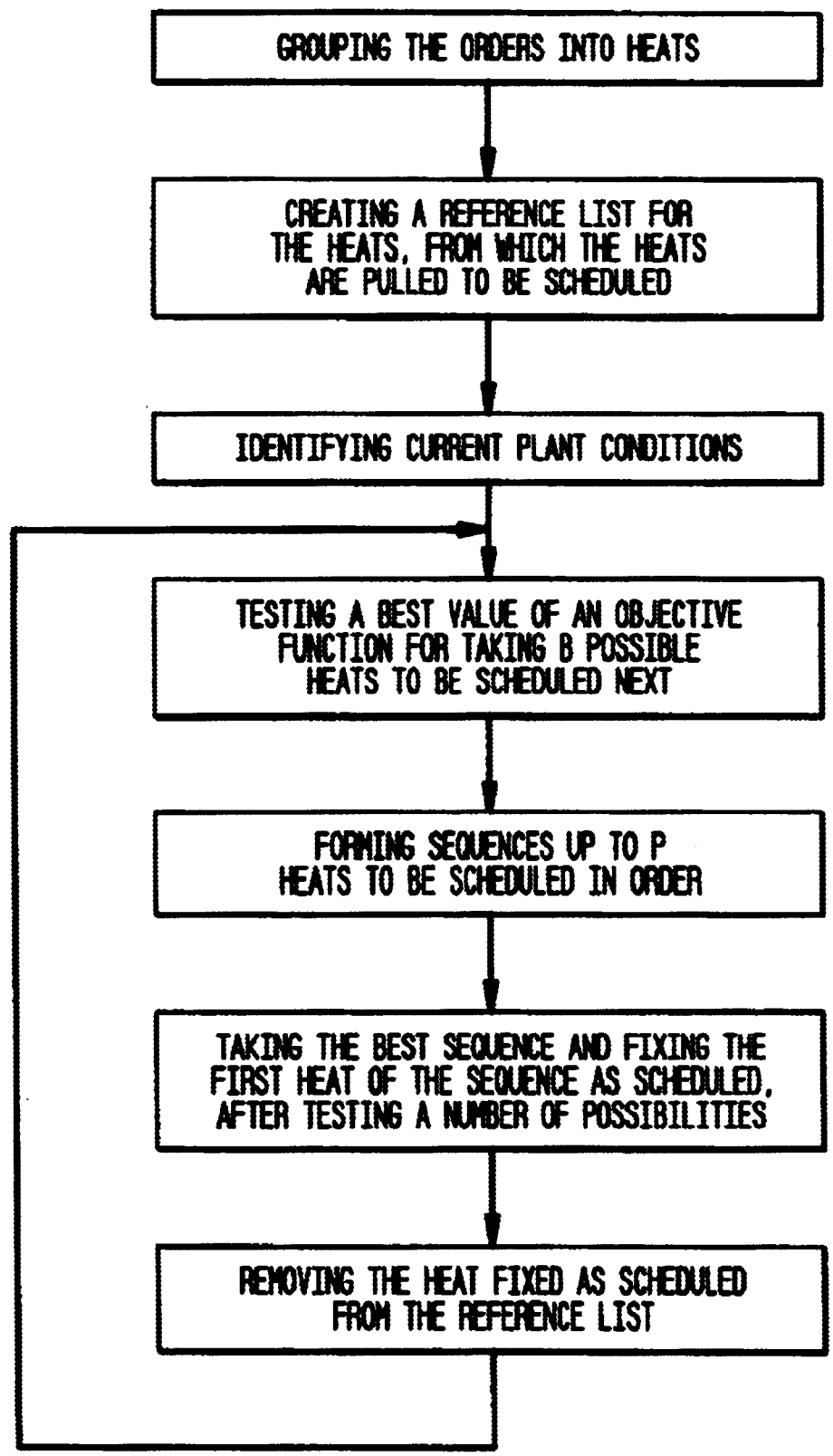
FIG. 3 shows a preferred search algorithm that may be used to solve a non-wait variant of the job shop scheduling problem.

FIG. 3 shows an algorithm for implementing this aspect of the invention. With reference to this Figure, the algorithm executes the following steps. The algorithm reads the information made available by the Plant Floor Operation system regarding what the plant has done and the situation of the metallic units and processing units. Then, this information is edited and adjusted by the user. The algorithm requires the user to edit the Frozen Horizon. That means, what each processing unit will be doing with the metallic units in the next few hours, given that a sudden change in the sequence of metallic units to be processed is not feasible to be followed by the plant. The information regarding the Plant Floor Operation and the Frozen Horizon includes the initial condition that the algorithm considers.

The algorithm reads what is the next step to be executed in the route assigned to each metallic unit. It replicates the metallic units in the set to each processing unit that can execute the step. Then, the algorithm assigns a virtual time indicator justified to the end of the Frozen Horizon and increases the virtual time until a metallic unit is released by a processing unit. The algorithm checks the next routing step of the metallic unit and places it in the set of the processing units that can execute the step.

The algorithm then verifies if all the metallic units of the same-type of the one that just finished are complete. If not, the next metallic unit of that type is assigned to the processing unit and its finishing processing time is evaluated. If it is complete, the algorithm selects among all the types of material available for that processing unit which one is the best type to go next considering the constraints and set-ups that may occur. Then, the best order of the metallic units in the selected group is defined considering the constraints specific for that processing unit. The first metallic unit is assigned to the processing unit and its processing time is evaluated. The algorithm increases the virtual time to the next event (process unit availability) and the previous step in this list is performed. It goes on until every routing step for all metallic units are executed.

The system is composed by a graphical interface with several screens (Windows '95) where the user can edit the data originated by the Plant Floor Operation System that reflects what the plant has been done. Preferably the user can edit and fix the near future part of the solution about to be created, given that the plant can not react to sudden changes that would happen in less than a few hours, and the user can set the approach preference for deciding which is the best group to go next and the metallic unit order internally to the groups. The user can also specify the sequencing rules and constraints for any processing unit in such a way that there in no need to compile the code if a new processing unit is purchased or if the sequencing rules of an old one have changed, and preferably the user can intervene in a given solution and change the metallic units assigned to processing units.

The graphical interface communicates with a server running the algorithm under UNIX system through MQSeries communication package. The server interfaces with the database (Oracle), sending back the output to the interface and database.

Appendix A included herewith describes various systems used in the present invention.

Figure 6:
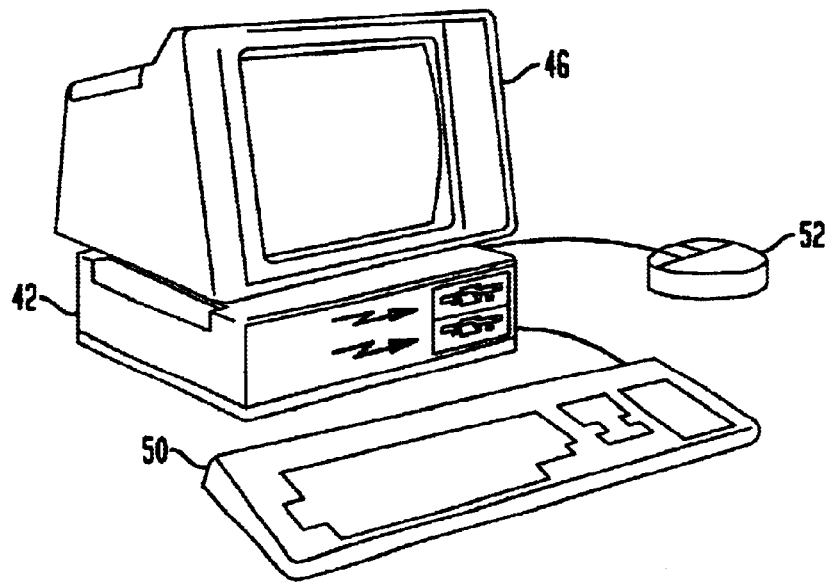
FIGS. 6 and 7 show a computer system that may be used in the invention.

As will be understood by those of ordinary skill in the art, the present invention may be carried out on any suitable computer or computer network. FIG. 6 illustrates, as an example, a computer of a type that may be used in the practice of this invention. Viewed externally in FIG. 6, a computer system has a central processing unit 42 having disk drives 44A and 44B. Disk drive indications 44A and 44B are merely symbolic of a number of disk drives that might be accommodated by the computer system. Typically, these would include a floppy disk drive such as 44A, a hard disk drive (not shown externally) and a CD ROM drive indicated by slot 44B. The number and type of drives vary, usually, with different computer configurations. The computer has the display 46 upon which information is displayed. A keyboard 50 and a mouse 52 are normally also available as input devices.

Figure 7:
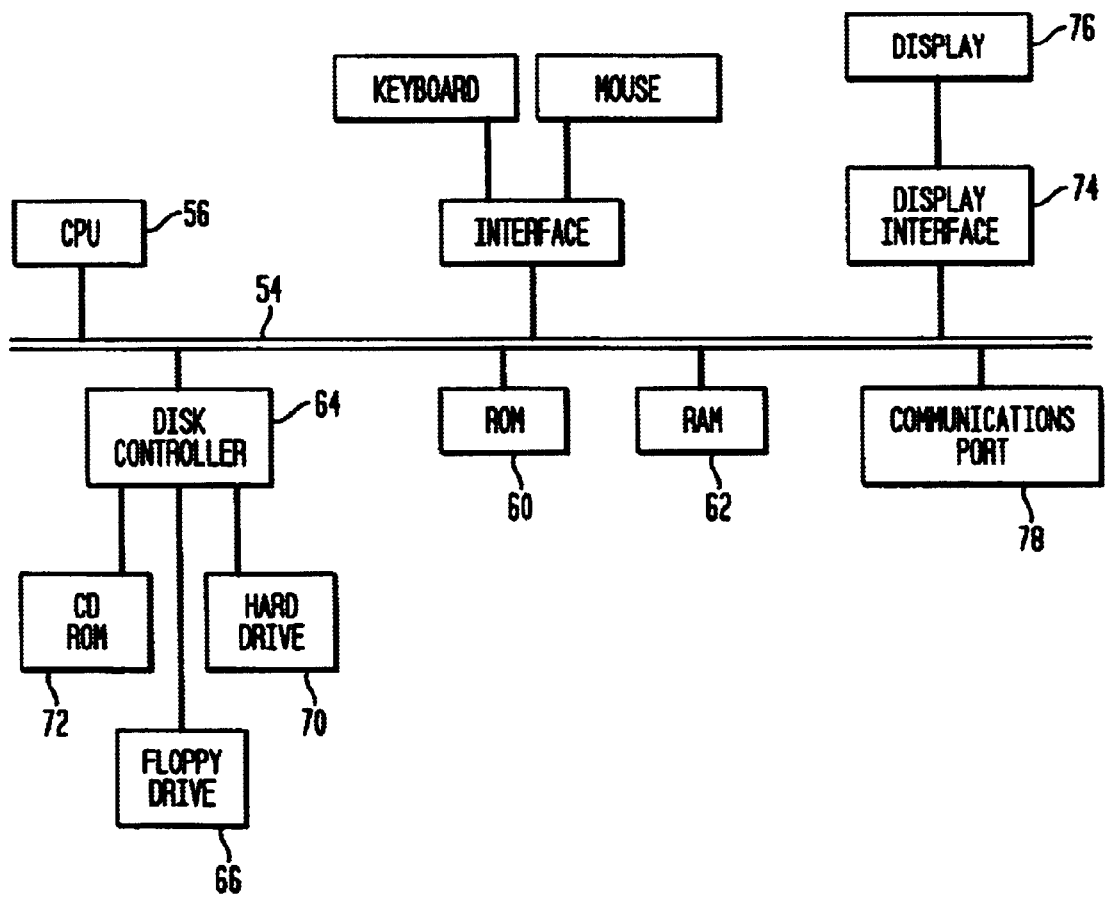

FIG. 7 shows a block diagram of the internal hardware of the computer of FIG. 6. A bus 54 serves as the main information highway, interconnecting the other components of the computer. CPU 56 is the central processing unit of the system, performing calculations and logic operations required to execute programs. Read only memory 60 and random access memory 62 constitute the main memory of the computer. Disk controller 64 interfaces one or more disk drives to the system bus 54. These disk drives may be floppy disk drives, such as 66, internal or external hard drives, such as 70, or CD ROM or DVD (Digital Video Disks) drives, such as 72. A display interface 74 interfaces a display 76 and permits information from the bus to be viewed on the display. Communications with external devices can occur over communications port 78.

Figure 8:
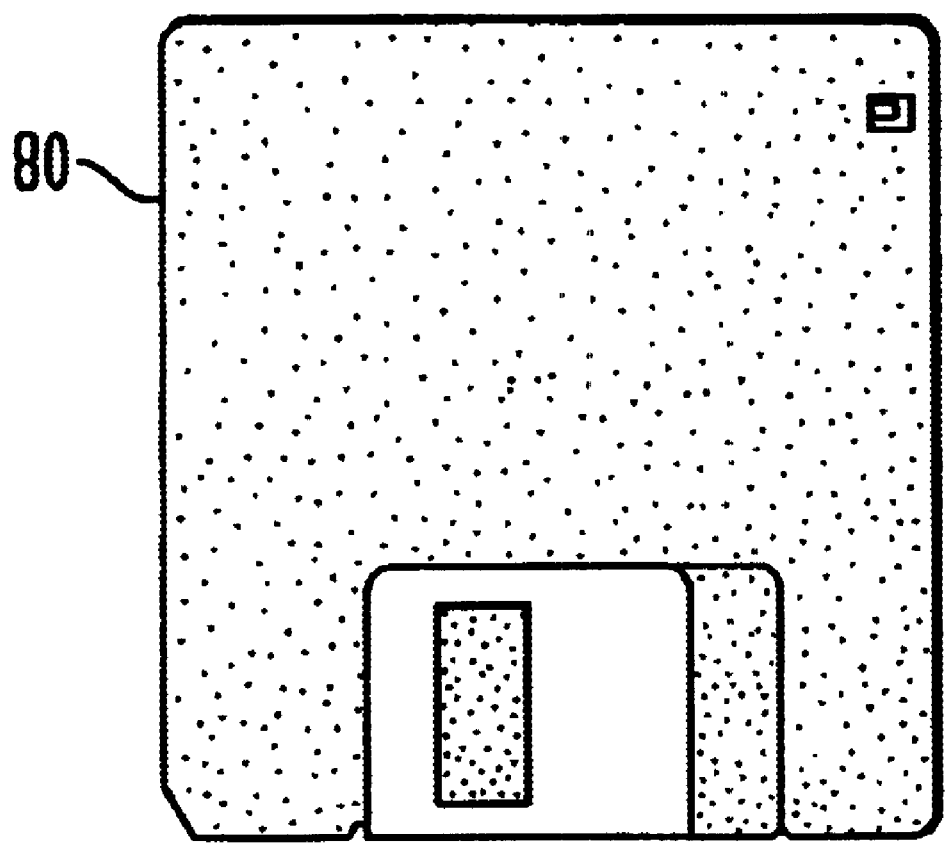
FIG. 8 illustrates a memory medium that can be used to hold a computer program for carrying out this invention.

FIG. 8 shows a memory medium 80 that may be used to hold a computer program for implementing the present invention, and this medium may be used in any suitable way with any appropriate computer to carry out the invention. Typically, memory media such as a floppy disk, or a CD ROM, or a Digital Video Disk will contain the program information for controlling the computer to enable the computer to perform its functions in accordance with the invention.

PROPOSED FUNCTIONAL ARCHITECTURE

Figure 9:
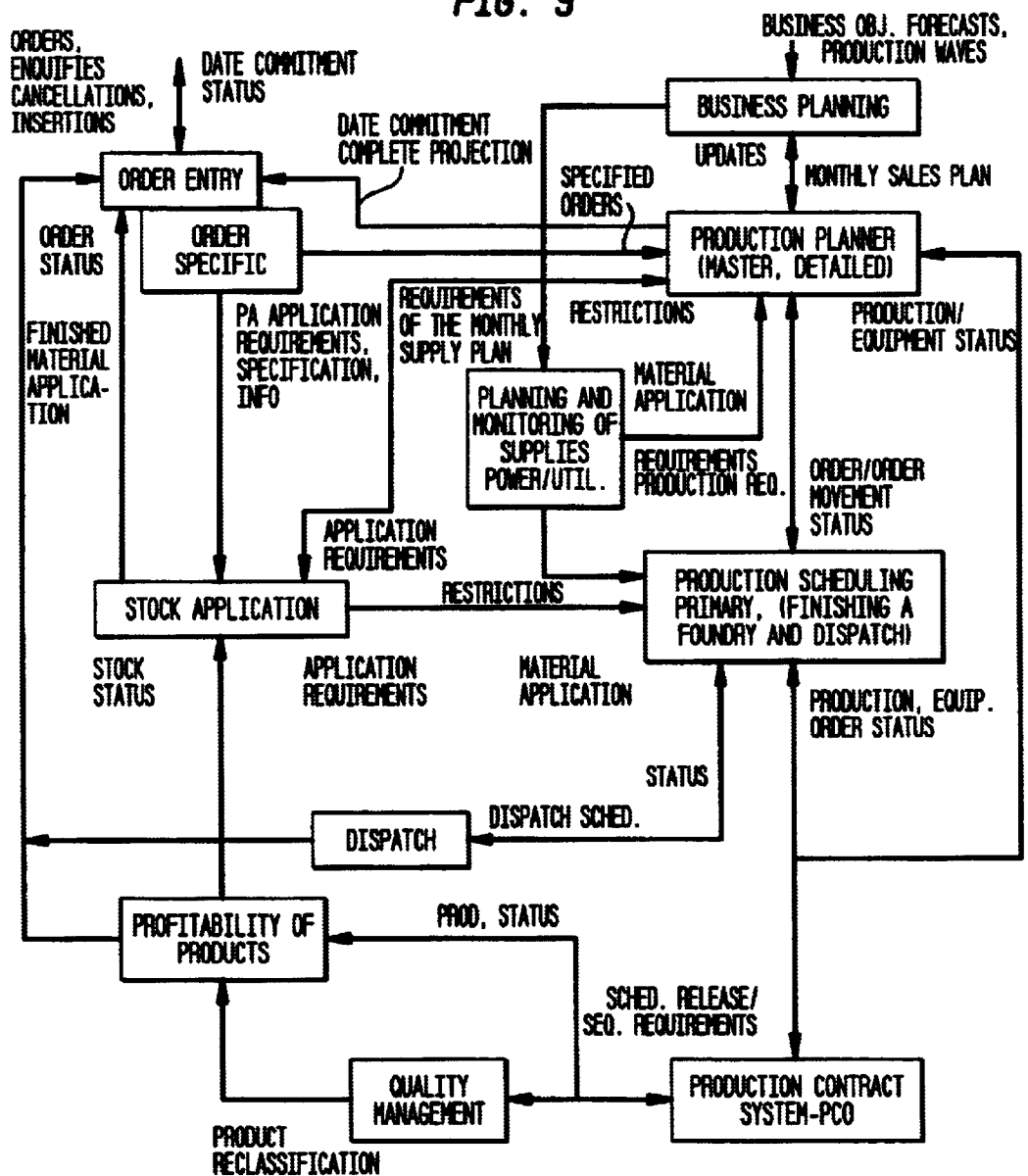
FIG. 9 shows a functional architecture that may be used with the method and system described herein.

FIG. 9 shows a functional architecture that may be used with the method and system disclosed herein. The basic object of a functional architecture is to establish a set of logical procedures that reflect the operational behavior of an organization. The architecture of FIG. 9 covers functional needs and offers some innovations in the operating procedures currently in use. Among these innovations, the number of production planning and scheduling layers is reduced, whilst nevertheless increasing the level of detail of the activities to be carried out. Another significant innovatory aspect is the application of the open book concept for entering orders. Under this concept, as the orders are placed, they are allocated one by one to the plant's resources. This means that planning can handle the plant's capacity sufficiently precisely to be able to set a reliable and speedy delivery date for an order, whilst nevertheless retaining flexibility of scheduling in order to best adapt the production sequence to inevitable unforeseen events. FIG. 9 shows the functional architecture. The remainder of this text will explain in detail the other characteristics and concepts supporting the raison d'être of this architecture.

The principal modules of the proposed architecture are:

Year Planner

Once a year, or whenever necessary, the production capacity of the plant is compared with the market conditions and an optimum proportion of how much is to be produced of each product is determined. The main events which will occur in the plant, such as long periods of maintenance, are considered and handled so as to reduce their effects on the company's profit.

Master Planner

This module keeps a check on the production availability of each type of product starting from a certain horizon (generally 3 months). This availability is used to supply the order delivery date. The optimum product mix generated by the Year Plan is updated and used as a basic datum by the Master Plan, which converts it from monthly periods to production weeks through the generation of production campaigns. Accordingly, the Master Planner can ensure that delivery date commitments are made aggressively, but viably.

Detailed Planner

For orders placed a short time before the delivery date (generally less than three months), a meticulous analysis is made of the availability of the plant and inventory with the Detailed Planner module. Daily production capacities are considered.

Primary and Finishing Area Scheduling

Orders must be selected and scheduled so as to meet commitments to customers and to effectively benefit from the plant's equipment. Grouping and sequencing constraints, configuration times and inter-dependence of equipment must be taken into consideration for loading the plant in the best possible way. As the production conditions change, the plant's scheduling must be adjusted to meet the new context and constraints.

Dispatch Area Scheduling

Shipping completes the processing stages of an order. The dispatch of orders must continue the process of optimization in the planning and scheduling undergone by the order, to minimize any delay in delivery and effectively explore transport alternatives. The integration of Shipping with Production Scheduling is achieved through the ability to view the material to be produced by the plant and by considering the load restrictions for dispatch.

Technical Specification and Routing of Orders

As the orders arrive, they must be specified technically and added to the database from which production planning and scheduling extract the information relevant to them. The nomenclature and terminology specific to the user and its standard products must be supported by this module.

Inventory Application

This module matches up the material available in the plant with the orders to be produced. The material may be plates, partially processed coils or finished products. Business rules are used to judge the quality of the match, for defining which order will be used when more than one fits the material and for selecting which material will be allocated to an order when more than one material may be applied. An analysis of the impact on plant capacity becomes necessary for each allocation.

Characteristics of the Proposed Functional Architecture

All the modules, such as Technical Specification and Routing of Orders, Planning, Production Scheduling and Inventory Application are fully integrated.

Both the "production for orders" and "production for stock" strategies can be supported.

All the modules are highly flexible owing to the broad parameter settings of the data they use.

Constraints and requests that benefit customer satisfaction and the maximum productivity of the plant are also considered.

Uses advanced techniques of Combinatorial Optimization and Artificial Intelligence, as well as algorithms specially designed for iron and steel industry problems.

YEAR PLANNER

Figure 10:
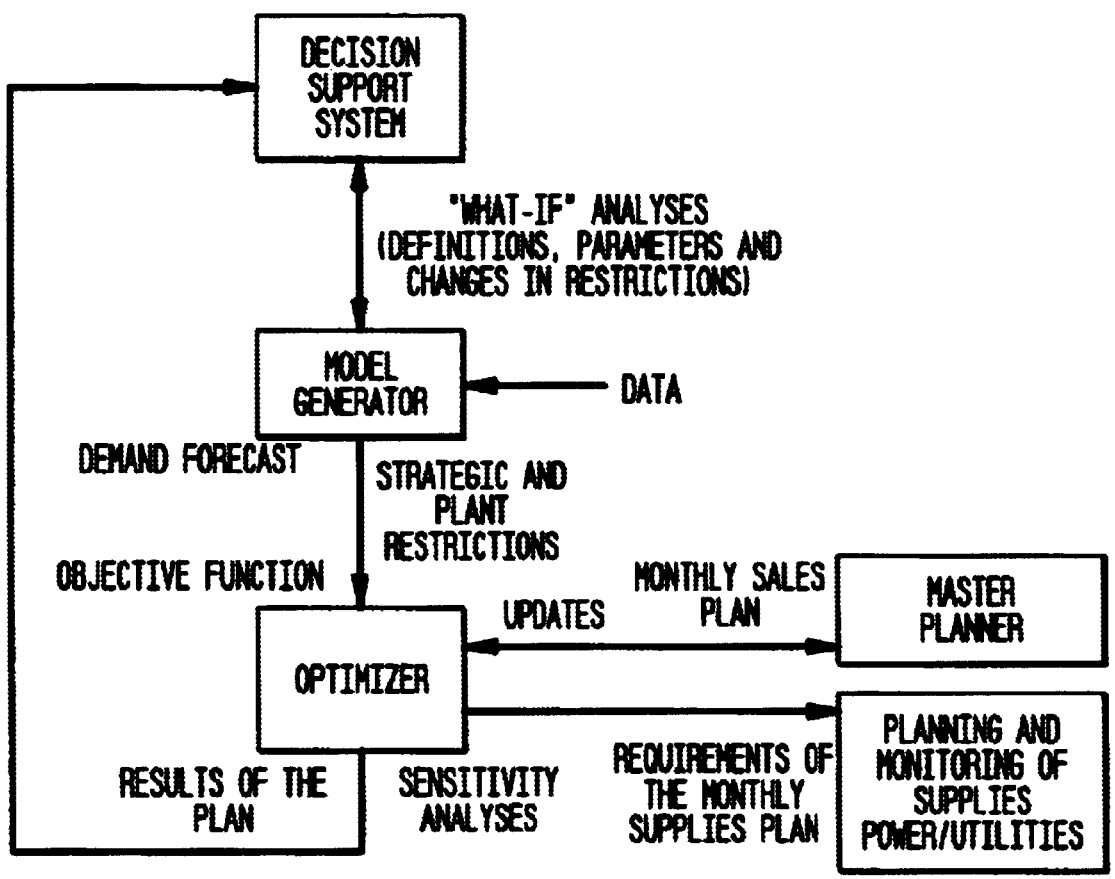
FIG. 10 shows the functional architecture of the Year Planner.

The main objectives of the Year Planner, shown in FIG. 10, are:

- to identify the optimum mix of products to be produced for a certain time horizon, given a market context and constraints to be met.
- to analyse the impact of critical aspects, such as market segmentation, commitment of production between products and prioritization in serving customers.
- creating a guide for the sales department with a view to the best product mix for the company for the period in question.

Detailed by each type of product that the plant can produce, an objective function is defined such that it can express the overall profitability of the plant for any product mix. The best product mix is that which maximizes this objective function, meeting all the constraints imposed. This type of problem is generally resolved by Linear Programming models. The tool to be adopted for implementing the model must provide, in addition to the solution, a sensitivity analysis of the constraints, identifying those that have the most impact on maximizing the objective function.

The plan generated by this module is reviewed and, via a Decision Support System interface, the impact of various scenarios on the objective function used can be tested. The final plan is published and stored for use as an initial platform for the lowest levels of planning.

FIG. 10 shows the functional architecture for the Year Planner.

Model Generator

This module is responsible for generating a suitable representation of the mathematical model defined by the user in the optimization module. The model consists of the objective function, which generally reflects the company's profit margin and the constraints to be imposed. The constraints usually consist of limits on the anticipated demand for products, capacity of the plant's machines and the relationship between processes. For the purpose of the Year Planner, the capacity of the machines may be just the number of hours that each of them is available for operation in a certain period of time.

Optimizer

This module generates the value of the objective function for the best alternative of all the possibilities, i.e. it generates the optimum solution. It also generates a sensitivity analysis enabling the identification of which variables, parameters and constraints are causing greater impact on the objective function.

Decision Support System and observes the result and the impact of the changes. This module ensures that the user will have the means of imposing his decisions on any automatically generated solution.

MASTER PLANNER

Figure 11:
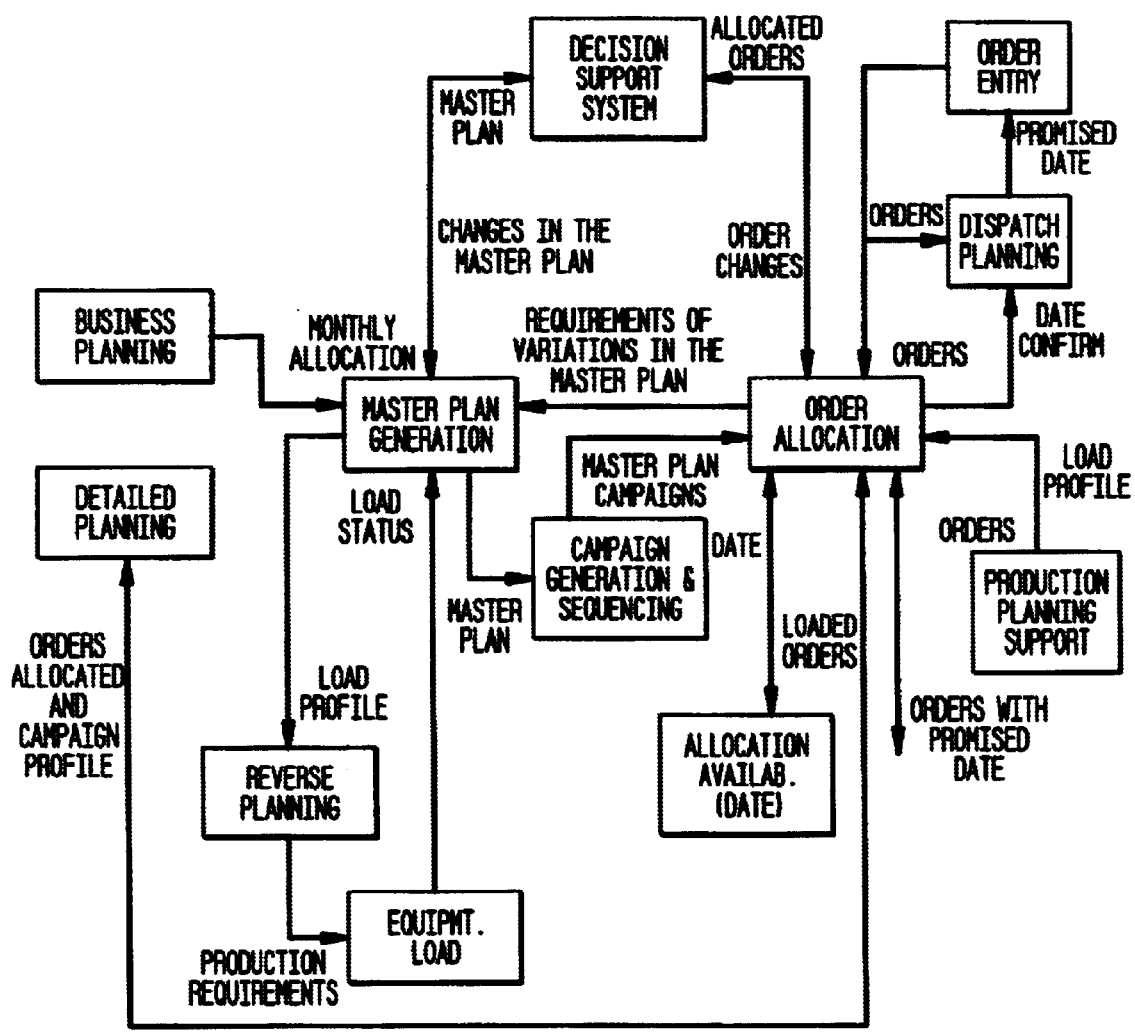
FIG. 11 shows the functional architecture of the Master Planner of FIG. 10.

The main objectives of the Master Planner, shown in FIG. 11, are:
1. To review the year planner assumptions and projections for the next few months and then confirm them or modify them.
2. To generate suitable campaign sequences for each month of production.
3. To analyse the following months in detail and generate a production plan for the plant to be used in undertaking the date for orders to be placed.
4. To allocate the orders to plant machines and generate viable delivery dates.
5. To generate information for the Planning of Supplies.

The Master Planner allocates the optimum quantities of products supplied by the Year Plan to lesser periods, generally of one week or ten days in duration. Accordingly, it must create the production campaign periods for the various types of products on the various plant equipment. The operating horizon of the Master Planner is usually three to six months from the current date, i.e. the horizon is dynamically adjusted each month. This means that each month's production capacities can be revised as long as the month is within the operating horizon.

New orders that fall within the operating horizon of the Master Planner are allocated against the plant's weekly production capacities so that the order delivery date may be determined. The accounting of the remaining capacity is kept continually up to date to be used on the arrival of the next order. For orders exceeding one week's production capacity, the Master Planner performs a running total calculation of the weekly capacities prior to the date wanted by the customer and allocates the order to the number of weeks that are needed. If, even so, there is not sufficient capacity for producing the order, it is not accepted. The earliest date that the order can be produced is notified. In the event of any cancellation of orders, the plant's available capacities are updated. FIG. 11 shows the functional architecture for the Master Planner.

Generation of the Master Plan

The allocation of capacity to the machines specified by the Year Plan is converted into weekly allocations, which form the basis of all the planning of the Master and Detailed Planner. The master plans for each product family are generated from non-detailed constraints of machine capacity and forecasts of customer demands which may be introduced directly into the Master Planner or via the data originating from the Year Plan. Each generated plan supplies a capacity for each product family which can be feasibly produced by the plant.

Since changes and unexpected events are inevitable, the plans can be revised automatically, given the conditions for which the replanning is performed, or manually, via the Decision Support System.

Campaign Generator

Once the Year Planner supplies the ideal product mix for the next few months, this module analyses this mix and generates a sequence of production campaigns that the various plant equipment must follow in order to produce these products in an optimized manner. The generation and sequencing of these campaigns must be in accordance with the plant's processing constraints and with the rules of business.

Allocation of Orders

When the orders are placed, they are assigned to periods of time, generally weeks, in which the master plans are created. Their delivery dates are determined and undertaken with the customer. If there is not sufficient capacity for producing in good time for the customer, the reason for this being impossible will be notified.

Reverse Planning

Starting from the requested delivery date, each stage of production in the route of a product is examined and the consumption of capacity and execution time are reflected in the Master Planner weekly periods.

Resource Allocation

Different products may require the same equipment in different ways. Thus, the allocation of equipment must be done in a balanced manner, just as the time in which the equipment is allocated to the product. Each product is associated with a load profile which gives how much the product consumes of each piece of equipment on its route in terms of tons per hour.

This module considers the periods in which the equipment may not be operating, with the consequent repercussion on the available production capacity.

Available-for-Undertaking

The capacity not yet consumed for each week handled by the Master Planner is totalled and accounted week by week by this module. Thus, we have the total available capacity at each period and for each product family. For each order that is accepted, the necessary capacity is decremented from each item of equipment and reflected in the availability of all the product families sharing the machines on the route of each accepted product.

Decision Support System

This module enables the user to interact with the system for introducing, observing and altering data and results supplied by the Master Planner.

DETAILED PLANNER

Even if an order has been entered normally by the Master Planner, nevertheless more thorough planning of the order is necessary when its production period approaches. There are several reasons for this. The orders currently in progress may consume a little more capacity than expected, reducing the capacity available for the entry of new orders. The plant's situation may have changed from the time that the orders were entered. Customers may have requested changes in delivery dates or specification of the previously requested orders. Material in production has been diverted and the order has to be replanned. Lack of sufficient raw material for processing the order.

Figure 12:
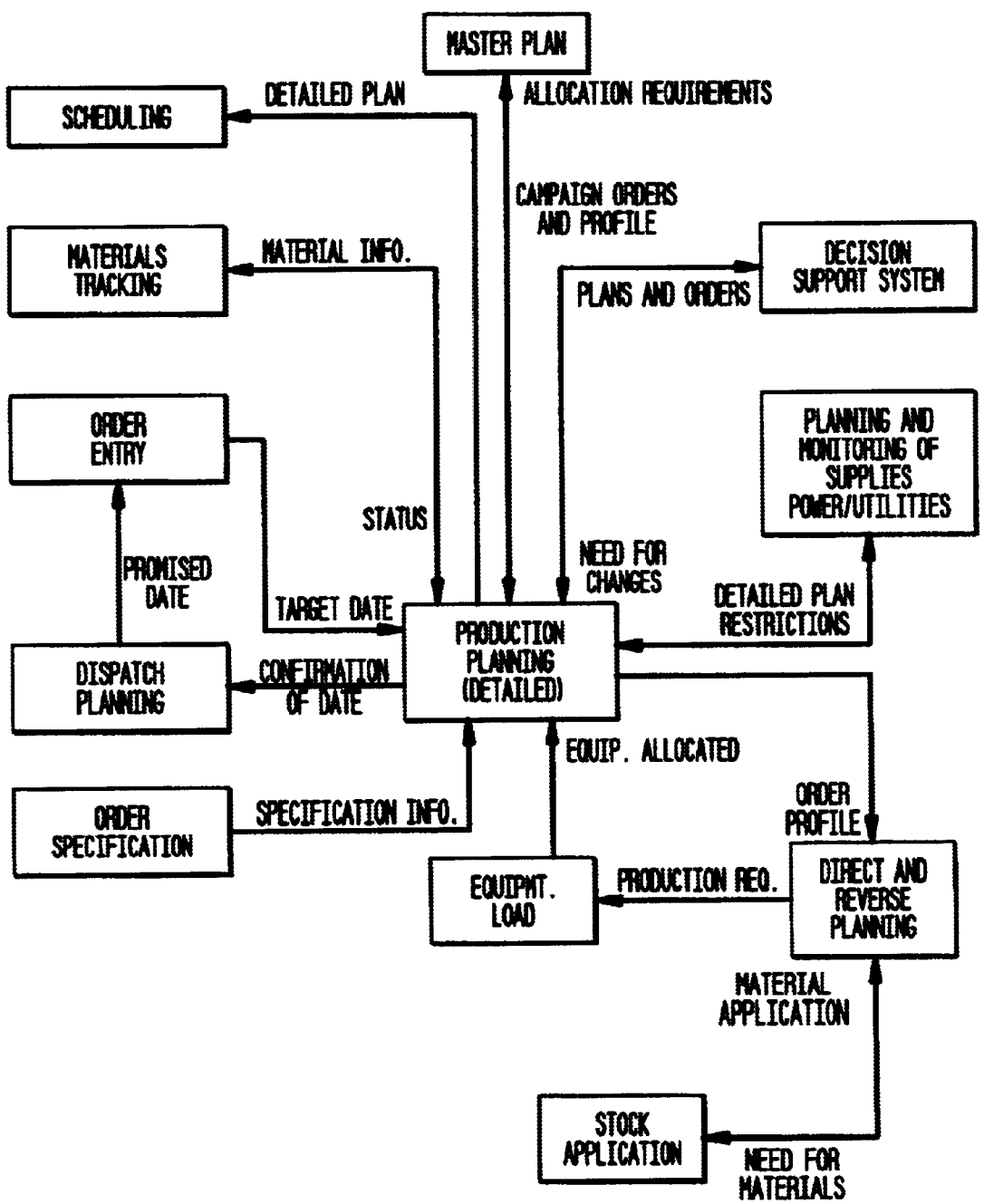
FIG. 12 shows the functional architecture of the Detail Planner of FIG. 11.

Thus, the Detailed Planner, shown in FIG. 12, provides precise monitoring of capacity and replanning of orders, and also uses the available inventory whenever possible. It forecasts the availability of the plant for the orders already in progress and for those not yet begun. The main objectives of the Detailed Planner are:
1. To create detailed order plans by product family.
2. To keep an up-to-date and accurate accounting record of the capacity consumed and available by product family and by equipment.

3. To generate a viable delivery date for new orders falling within the operating horizon of the Detailed Plan.
4. To supply orders to the scheduling system for the requested period.
5. To use inventory availability for planning and replanning orders.

For better use of the plant's capacity, some orders may be brought forward if there is excess capacity. Similarly, in the event of overload, some orders may be delayed and the user may then redefine the plant's available capacity for various product families in order to alleviate the impact of possible delays.

The functions of this module may be used to analyse the consequences of exchanging, altering and replanning orders. Thus, the user can examine the possibilities of speeding up the production of priority orders.

At each step in the production process, the detailed plans furnish the consumption data for each type of material used in production. From this data, the appropriate amount of raw material can be calculated that will be necessary to support production.

The final plans for each product family are published together with the production and inventory requirements. Replanned orders and unexpected capacity bottlenecks are reported.

The functional architecture of the Detailed Planner has the following characteristics:

Production Order Planning

The planning mechanism loads the orders in progress and the new orders starting from the specified week for merging by the Master Planner and those that have their delivery dates delayed will be listed for the user. The production levels of each product line are defined for each item of equipment contained in their routes. This module tries to overcome bottlenecks by using alternative resources, starting order processing earlier, or by delaying some orders. The orders each day, as well as the initial and final inventory levels.

Reverse and Direct Planning

Starting from the delivery date, each stage of production in the order route must be examined to ensure sufficient time for producing the order, given all the production times of each stage. If necessary, the orders can be projected from the week of merging for defining the nearest delivery date.

Equipment Load

This module is similar to that encountered in the Master Plan, but with more details. It considers the time of processing by the equipment, equipment configuration time, line constraints and daily capacities.

Planning and Monitoring of Supplies and Power/Utility

The limiting constraints of supply and power are considered so as to maintain a viable allocation of orders to the plant. Within the valid limits, the Detailed Planner reports the levels of supplies and power that will be necessary for producing orders.

Decision Support System

The user will have to interact with the Detailed Planner to resolve operational exceptions and to assess alternatives for loading resources and replanning. With unforeseen events, it may be impossible to deliver all the orders without there being a delay; the user must intervene and decide which will be delayed and which will not. The impacts of changes in quantity, specification and delivery date of orders also must be analyzed by the user.

PRODUCTION SCHEDULING

Figure 13:
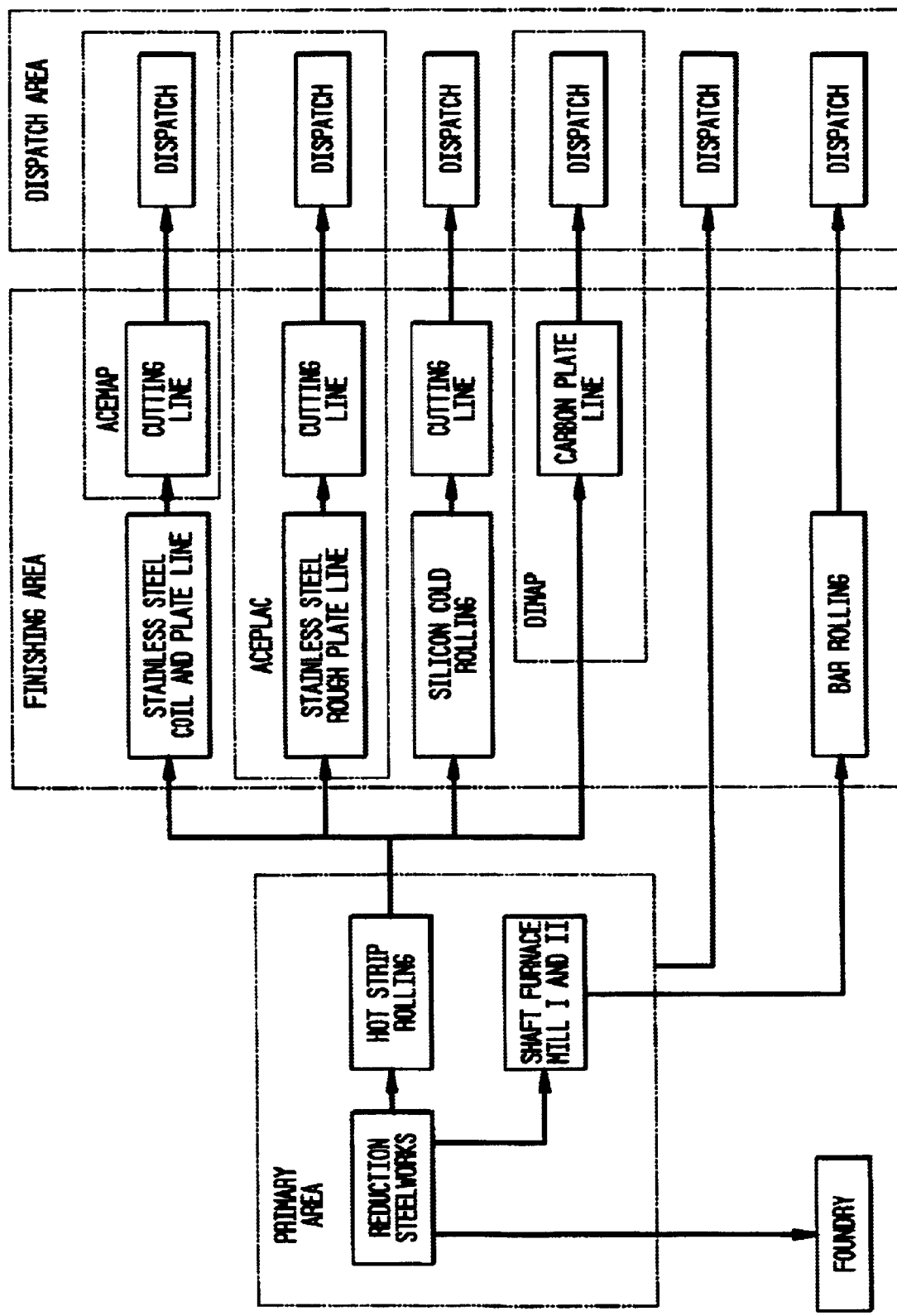
FIG. 13 shows a Production Scheduling system.

The Production Scheduling system, shown in FIG. 13, is composed of four modules: Primary Area Scheduling, Finishing Area Scheduling, Dispatch and Foundry Area Scheduling. FIG. 13 shows these areas and the relationship between them.

Primary Area Scheduling

Figure 14:
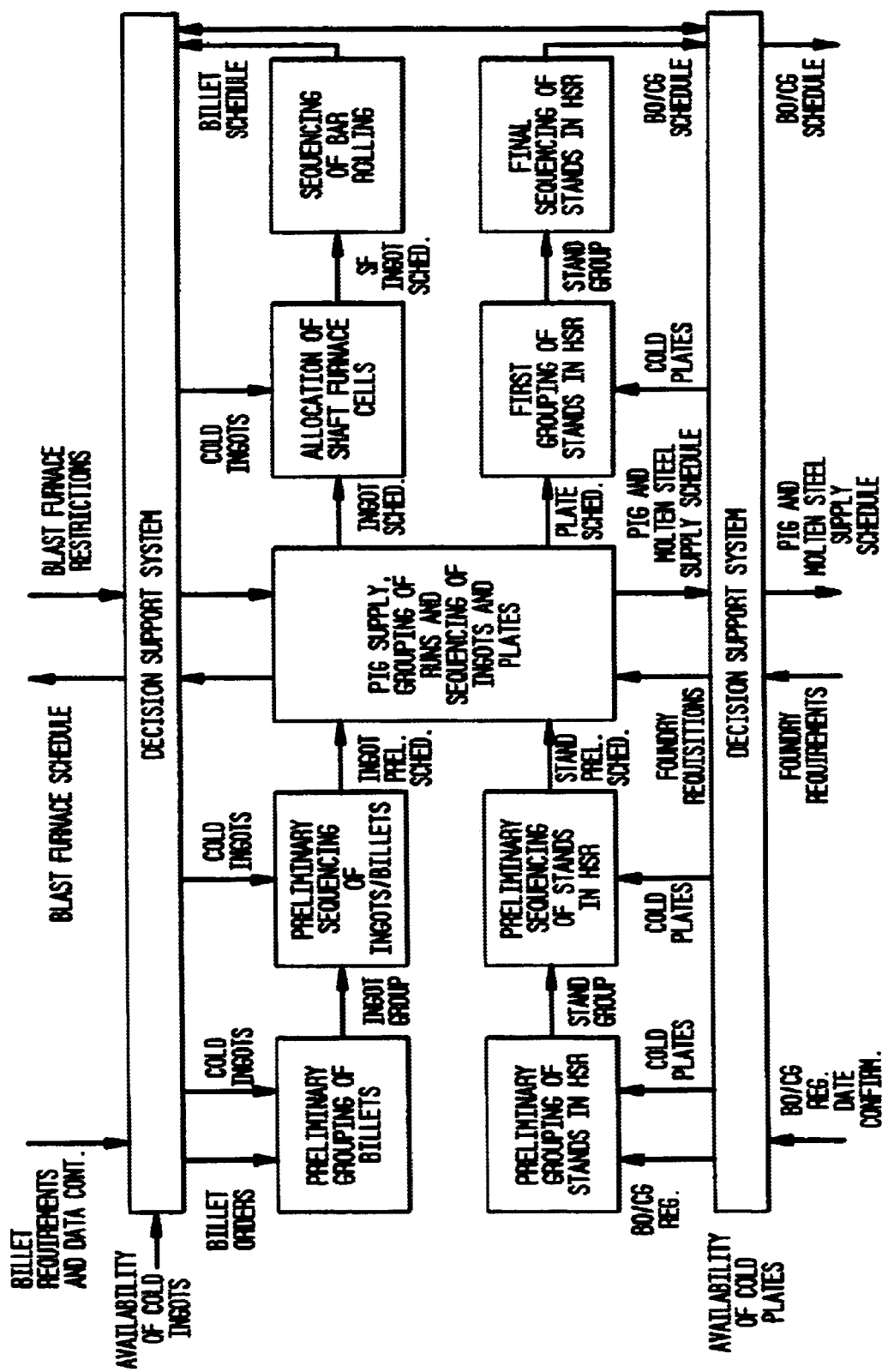
FIG. 14 shows the functional architecture of the Primary Area Scheduling.

The architecture of the Primary Area Scheduling, shown in FIG. 14, is based on the following requirements:

Providing a display of the primary area equipment for the desired scheduling horizon, e.g. a week or several days (from here on we shall regard this horizon as being one week). The solution generated must take into consideration all significant constraints so that the scheduling is as faithful as possible to reality.

Generating a detailed schedule for the equipment, taking into account pig iron supply constraints, constraints in grouping, sequencing and timing of equipment and the supply demands of the Foundry and Finishing Areas.

The architecture of FIG. 14 provides an integrated schedule for all the principal equipment of the primary area.

The scheduling process begins with the selection of orders for a specific week. Orders are grouped together for creating the best billet formation sequence from the point of view of the bar line and the best stand sequence from the point of view of the Hot Rolling Area. To these sequences are added the pig iron supply constraints and the pig iron requisitions made by the Foundry for then generating the scheduling of what is actually viable to be produced by the steelworks. The actual schedules of ingots for the bar line, plates for the Hot Rolling area, limits of supply of pig iron by the Blast Furnaces and steel for the Foundry are considered for the final generation of billet and coil scheduling and for the internal scheduling of the Foundry. The scheduling of the pig iron supply of the Blast Furnaces is generated within the valid limits. Throughout this process, all the relevant constraints will be considered for the maximum suitability of the solution to the situation of the plant at any given moment.

Once a solution is generated, the user may erase and rework any part of the solution. Thus, any possible constraints which are not normally required to be considered may be imposed manually by the user.

A new solution must be generated whenever the proposed scheduling clashes significantly with the plant situation. Examples of events that may require new scheduling are: diversion of material, insertion of new orders, order cancellations and breakdown of equipment.

The functional architecture modules of the Primary Area shown in FIG. 14 are:

Preliminary Grouping of Billets

The bar finishing line orders are grouped according to the similarity of characteristics wanted in the sequencing of the billets, e.g. grade of steel, delivery date and configuration of the bar rollers. After consideration of the cold ingots available in stock, the best grouping of billets is generated. At this point, specific constraints of the steelworks equipment should be disregarded.

Preliminary Sequencing of Billets and Ingots

Given the groupings supplied by the previous module, the best sequence of billets is generated and the corresponding ingot sequence for the bar rollers. One of the basic objectives is the hot charging of ingots whenever possible. Available cold ingots are calculated. Steelworks constraints are still disregarded.

Preliminary Grouping of Stands

All the orders requisitioned by Hot Rolling for the desired scheduling horizon are grouped by the characteristics appropriate to the rolling process: e.g. width and thickness of the plates, delivery date, and type of steel. Plates available in stock must be considered.

Preliminary Sequencing of Stands

Considering the stands formed in the previous module, a sequence of stands is generated, so as to best meet the constraints of plate rolling. Again, available cold plates are considered, but the majority of the constraints relevant to the steelworks are not.

Formation of Runs and Continuous Ingoting and Blast Furnace Sequencing

For each ingot of the sequence requested by Bar Rolling and each plate of the sequence requested by Hot Rolling, the time is determined that the ingot or plate may wait between the end of ingoting and the start of charging for rolling. The ingots and plates are grouped in runs so as to maximize the number of ingots or plates that overlap in the period that they have available to be charged hot. As the runs are formed, they are assigned to the equipment (e.g. BOFs, pot furnaces, degasifier) for ensuring that the continuity of processing of the run within the steelworks is viable. All the constraints of the continuous rolling mill which may involve sequences of several runs are verified, as well as the limitations and impositions of the Blast Furnaces. The demands from the Foundry are accommodated between the runs being created. This module generates the possible scheduling of being supplied by the steelworks for the ingots, plates, Foundry servicing and distribution and pig iron of the Blast Furnaces as near as possible to what is demanded at the steelworks.

Allocation of Shaft Furnaces

Given the actual sequence of ingots to be produced by the steelworks, this module must select the cells of the shaft furnaces available and assign them the ingots, making all the necessary time allowances, as well as considering the reheating of the available cold ingots.

Sequencing of the Bar Rollers

Once the sequence is given with which the ingots are available to the shaft furnaces, the sequence with which they must be rolled is determined, taking into account the timing and configuration constraints of the rollers.

Final Grouping of Stands

Given the final sequence of plates to be produced by the steelworks, the time available for hot rolling each of them is calculated. By maximizing the number of plates with overlapping of these times, the plates are grouped in stands, achieving homogeneity in width, thickness, delivery date and type of steel of the plates. The available cold plates are also considered. All the constraints of forming the stands must be satisfied.

Final Sequencing of Stands

Once the stands are defined, the constraints imposed by the hot rolling area and the nearest order delivery date within each stand are considered, generating the final scheduling of the stands and consequently of the hot coils and rough plates.

Decision Support System

The user may review the solutions generated and alter them. If the modifications violate any constraint, the user will be notified, but it is his decision whether or not to keep the modification.

FINISHING AREA SCHEDULING

Figure 15:
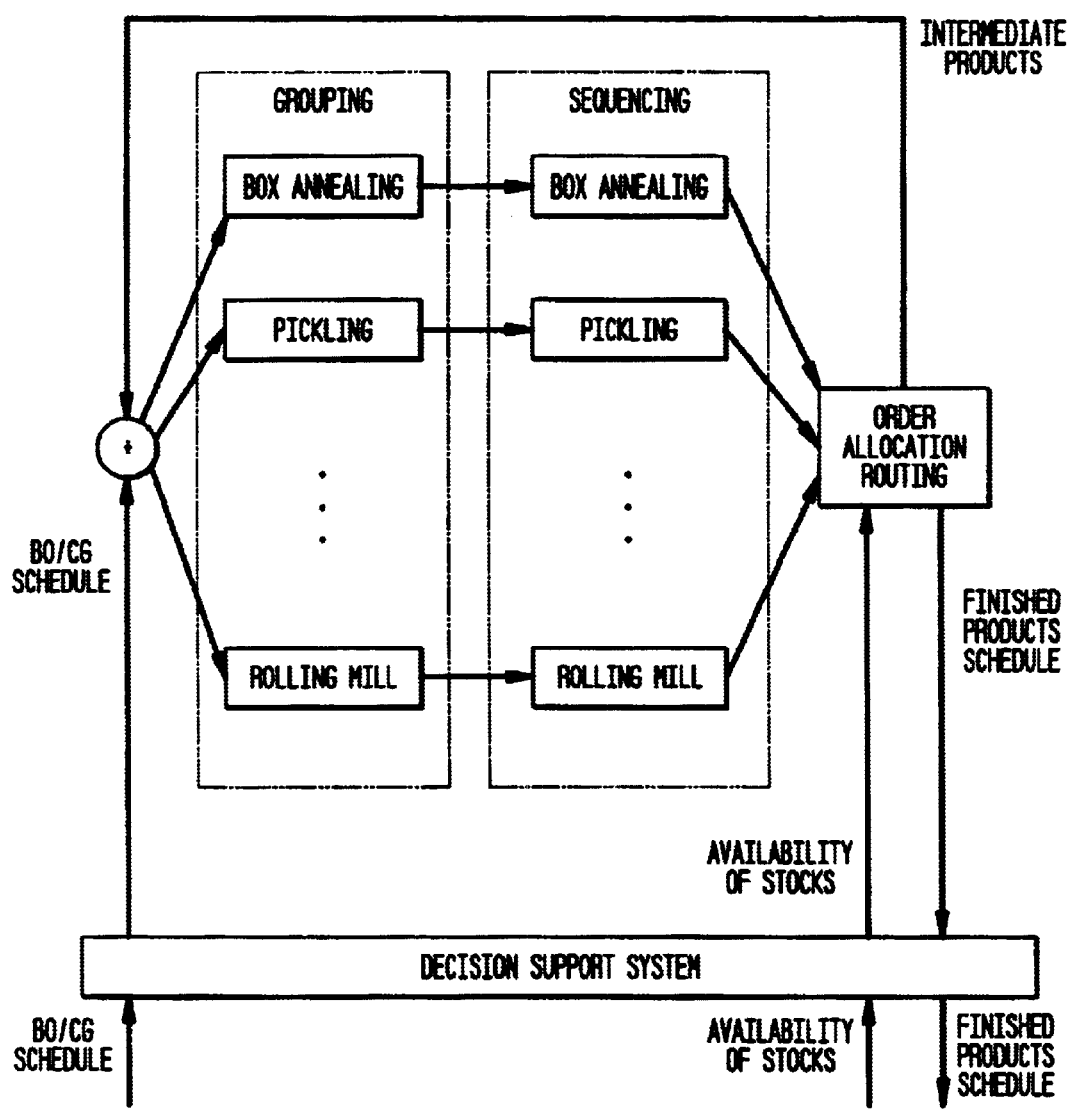
FIG. 15 shows the functional architecture of the Finishing Area.

FIG. 15 shows the functional architecture of a finishing area. The finishing area shown in this Figure consists of the Stainless Steel Coil and Plate Finishing Lines, the Silicon Finishing Line, their respective Cutting Lines, the Carbon Cutting Line and the Bar Rolling Mill.

The proposed architecture for the Finishing Area is based on the following points:

generation of a schedule for the Finishing Area equipment for a certain horizon (e.g. a week), taking into account all the constraints of this equipment.

minimizing the configuration times of the equipment and order delays.

The orders supplied by the Primary Area are grouped together and sequenced for a week. All maintenance periods must be taken into account. Inventory Application has an important role in the use of material in progress which is diverted.

A description follows of the approaches to be used for scheduling each of the finishing lines.

Stainless and Silicon Steel Lines

These two finishing lines have very similar characteristics with regard to the operating procedures of production: all the equipment in these lines, as a rule, passes through two operating stages. The first is a grouping of orders meeting the operating constraints of the equipment, e.g. all the coils in a group must belong to the same type of steel. The second stage is that of sequencing, in which the coils of a group are sequenced, e.g. the coils must be in order of decreasing length. At the end of a sequencing stage, the coils are released to the next equipment on their route, being made available to be processed.

The sets of coils that are grouped together in a particular machine and have the same route are still not allocated to one order, but to a set of orders, i.e. the allocation of metal units to orders is done as late as possible, so as to benefit from the possibility of selecting which order should be treated as diverted and which should continue forward when a diversion occurs. At the start of each system operation, the function of refining order allocation creates the initial groups of orders for each of the items of equipment.

The grouping, sequencing and order allocation refinement cycle is repeated until all the orders have been processed by all the equipment on their routes. The Decision Support System enables the observation of the results and the intervention of the user at all levels of decision taken (i.e. valid for the remaining lines of the Finishing Area).

Bar Rolling

The scheduling of billets (rough bars) originating from the rollers (MILL 1 and 2) is taken into account so that suitable groups of material are formed and sequenced by the equipment of the Bar Line Finishing Area. The approach to the solution of this type of problem may be regarded as a special case of the approach described for Stainless/Silicon steel, since the equipment has similar grouping and sequencing characteristics. Both the scheduling of billets and that of finished products can be altered and adjusted by the Decision Support System.

FOUNDRY

Figure 16:
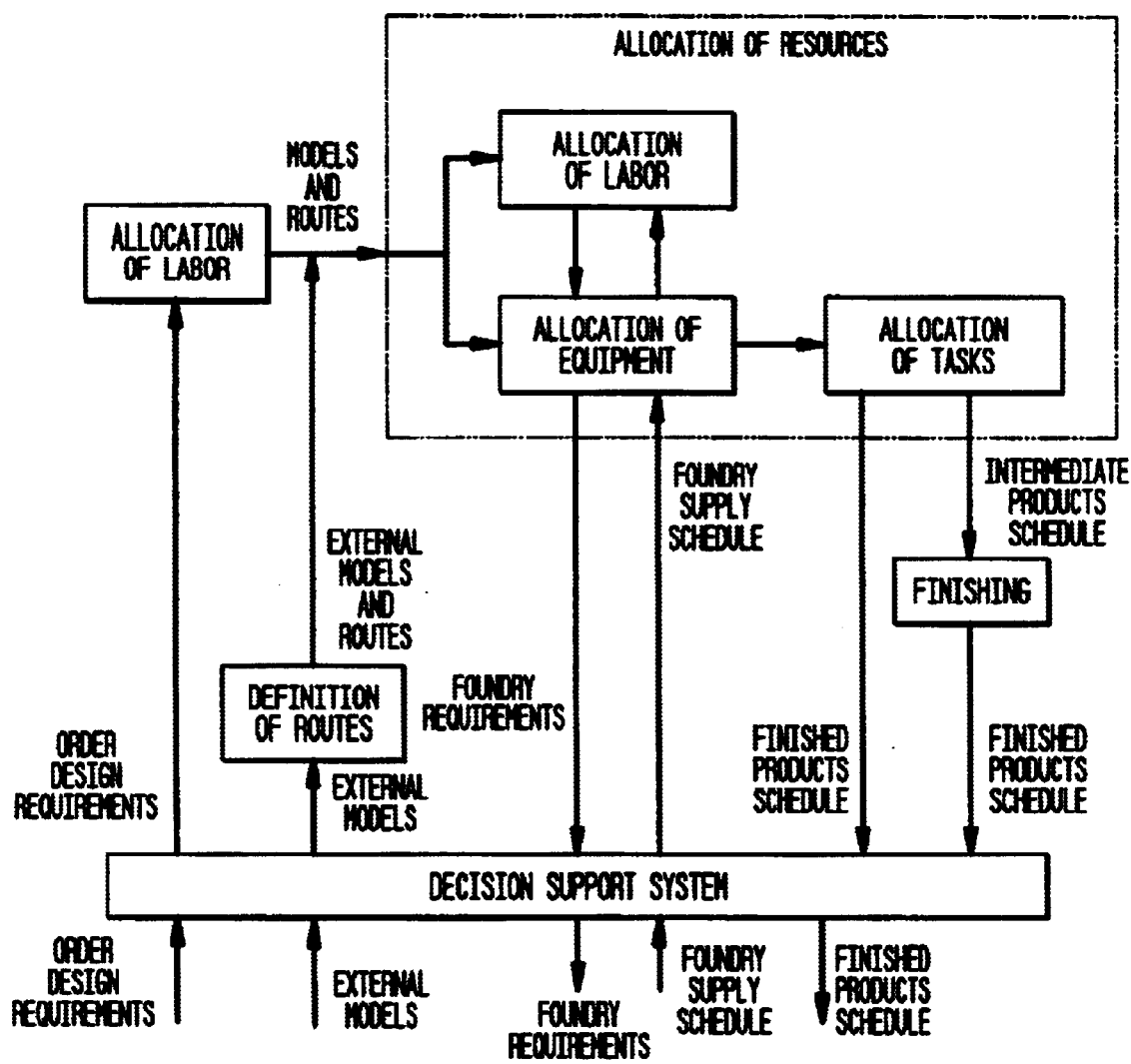
FIG. 16 shows the functional architecture of the Foundry Scheduling.

FIG. 16 shows the functional architecture of the Foundry Scheduling. This is an area that operates separately from the rest of the plant, except for requisitions for steel from the Steelworks and pig iron from the Blast Furnaces.

The first step in the process of casting is the allocation of human resources to the planning phase of a new order, in which the models and production routes are generated for the equipment. External models may also be acquired and their routes determined.

Owing to the existence of more equipment than manpower to operate it, human resources become critical in the Foundry. Accordingly, a careful check is made to simultaneously allocate a human resource to an item of equipment so as to carry out each task specified in the routing of an order.

The final production phase of an order may involve a finishing stage, when we then have the scheduling of the finished products. Again, both the data supplied to the Foundry and that generated by it may be modified by the user via the Decision Support System.

DISPATCH SCHEDULING

Figure 17:
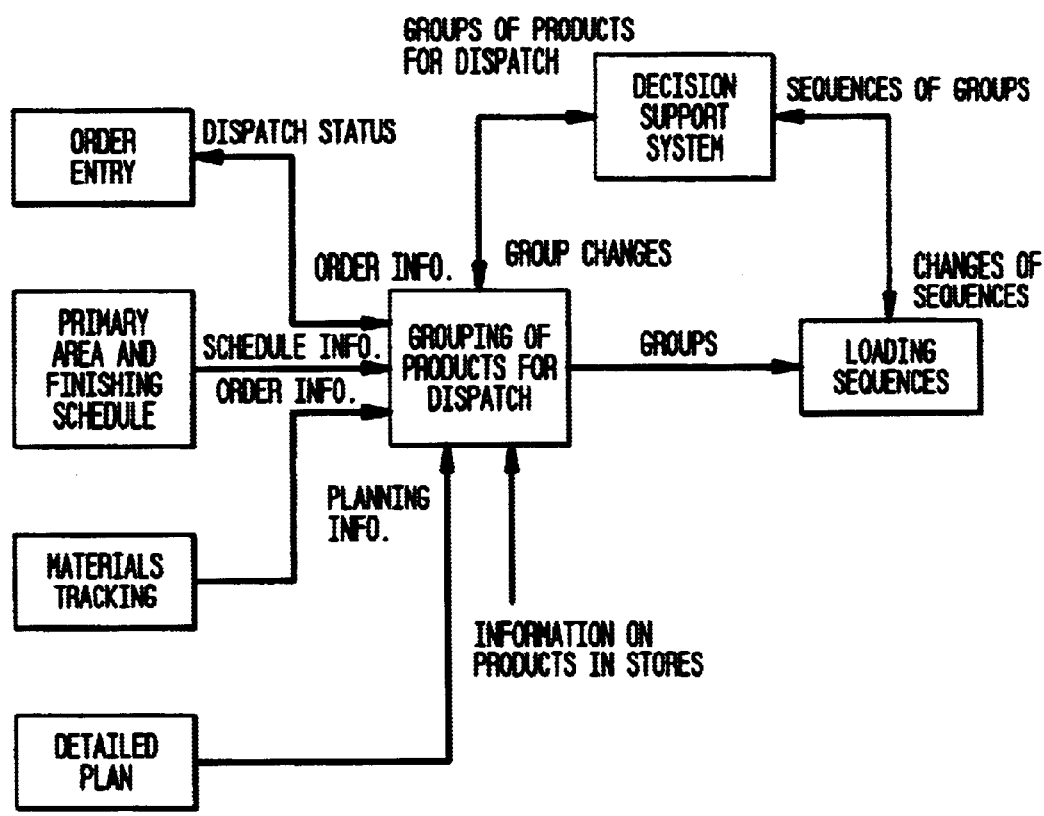
FIG. 17 shows the functional architecture of Dispatch Scheduling.

FIG. 17 shows a functional architecture of Dispatch Scheduling. The transport function completes the production process of an order in the plant. This function must generate a schedule that minimizes delay in delivery and suitably explores transport alternatives. The architecture of FIG. 17 is based on the following basic points:

Generating a schedule for a week (or any desired period) for each means of transport (lorry, train, ship, etc.) taking into account the scheduling of the finished products produced by the plant.

Adjusting the daily scheduling whenever necessary.

Developing a load schedule based on the haulage companies' scheduling.

Generating new scheduling when any serious distortion occurs in the availability of products or of the means of transport.

Generating a schedule that minimizes delivery delay and transport cost.

Enabling monitoring of the performance of the haulage companies.

Shipment Grouping

This function receives the scheduling of the finished products and groups them together with those found in a shipping depot. These groups will be dispatched by the various haulage companies. This module minimizes delivery delay and the cost of transport.

Load Sequencing

The grouped orders are sequenced to form a load schedule based on the haulage companies' scheduling. Constraints such as availability of space for handling the load and haulage capacity must be taken into account.

Decision Support System

The user must have a clear view of the orders that are to arrive from the plant and of those in the shipping depots. Moreover, the user must be able to correct and alter any data considered or generated by the Dispatch Scheduling module. This function also monitors the level of deviation between what is scheduled and what is carried out, generating the necessary information for when new scheduling is wanted.

TECHNICAL SPECIFICATION AND ROUTING OF ORDERS

Figure 18:
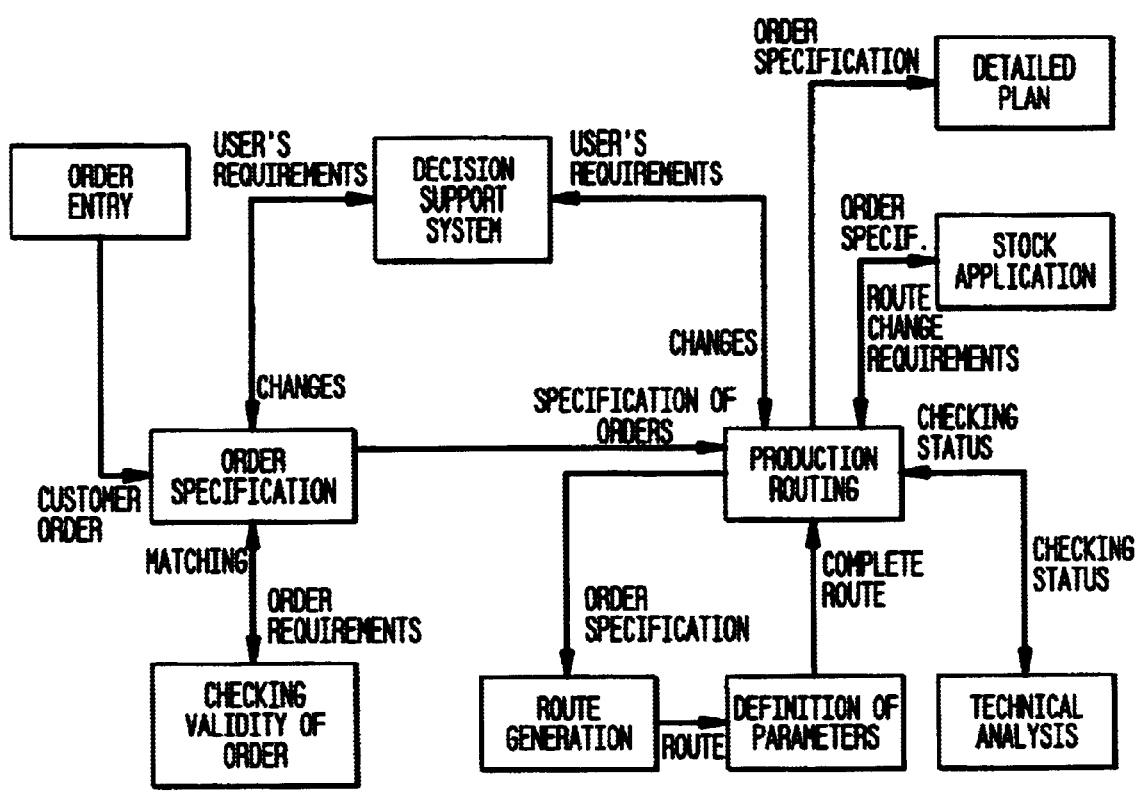
FIG. 18 shows the functional architecture of Order Specification and Routing.

On entering an order, it must be quickly and dynamically specified. The order specification and routing architecture of FIG. 18 (FIG. 13) is based on the following points:

Reducing or eliminating manual specification and routing through the maintenance and updating of metallurgical knowledge and specification of orders.

Dynamically specifying orders with routing information, as soon as the orders are placed by the customers.

Keeping the orders in a repository equally accessible by Planning and Scheduling.

Providing a viability check for the specification of orders and automatically rerouting the orders whenever necessary.

The order specification process begins with access to the customer orders supplied by the order entry function. Customer requests are translated into the user's internal nomenclature.

According to the type of product specified, the grade of steel, the width, the length and the quality, the routing is generated to reflect the load demands of the order on the equipment of the route. The routing must include information on the sequence of equipment on which the order needs to be processed, processing times on each item of equipment, production rates, and intermediate dimensions at each stage.

The viability of producing the order as specified is checked against the capacities of the equipment to ensure that the order can be physically processed as specified. If the check fails, an alternative route, if it exists, must be automatically generated.

All the orders specified are evaluated with cost information based on their route. These orders are equally accessible by Planning and Scheduling.

Specification of Orders

This function translates the information from the customer order to the user's internal order standard. International technical standards are used and pre-defined information is supplied in cases where some characteristics of the order are not provided by the customer.

Checking the Validity of the Order

This function is performed for each order placed. If the order cannot be processed, this information is passed on to the Decision Support System function, which must provide the means for requests to be altered if possible.

Route Generation

Once an order passes the production viability check, its standard production route must be generated. Information on the order, customer preference and rolling mill conditions are taken into account.

Alternative Route Generation

If a route cannot be found, a request for re-routing must be sent to this function which, in its turn, will attempt to discover an alternative route.

Cost Generation

This function calculates the cost of an order based on the routing associated with it.

Decision Support System

The user can observe the information supplied and generated by the Specification and Routing module and modify it as he considers necessary.

INVENTORY APPLICATION

Figure 19:
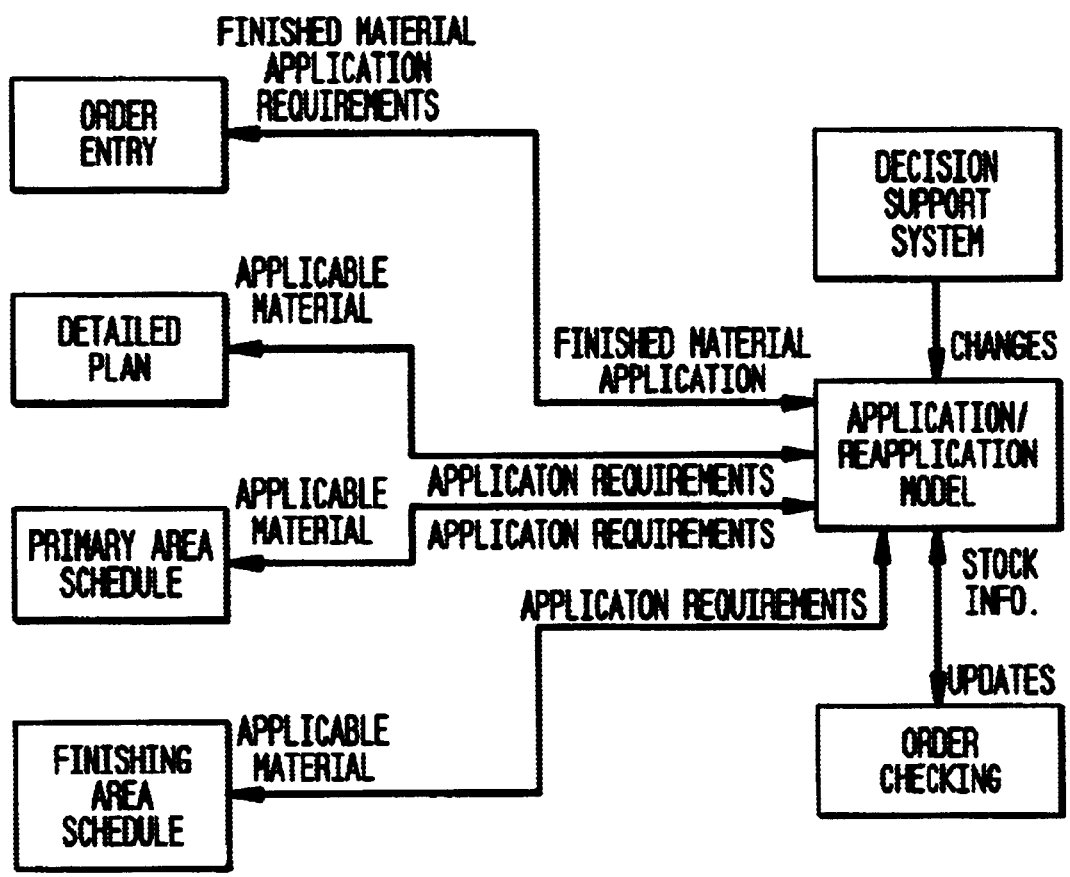
FIG. 19 shows the functional architecture of Inventory Application.

The Inventory application process, shown in FIG. 19, matches the relevant attributes of the available material to the specifications of the orders and determines the eligibility of the material for a given order. The material may be plates, partially finished coils or finished products. Business rules are used to judge the suitability of the allocation between the available material and the order, both when there are several materials for one order and when there are several possible orders for a particular material. Inventory Application to an order will cause an impact upon the Detailed Planner and Scheduling.

The Inventory Application process begins with the analysis of new orders to determine which can be assigned to the existing inventory of plates and coils. Some characteristics that may be considered are: chemical properties, quality, width, thickness and weight.

When multiple candidates are available, the best choice is identified according to a predefined preference list. Once a plate or coil has been applied to an order, it will no longer be available for other applications. The user may intervene whenever necessary.

Allocation/Re-allocation of Orders

Order data and inventory data are processed by this function. Specific attributes of orders, plates and coils can be compared. The matching criteria, order attributes and the candidate plates or coils are examined. The viability of the match between the order and the material is determined.

Predefined rules are used for prioritizing in the event of multiple matching possibilities.

Decision Support System

This function has to support the intervention of the user in the decision process on the suitability and availability of candidate material to be allocated to an order.

BENEFITS

The described functional architecture will bring a series of benefits. Some of them are found below:

- Optimization of the profit margin and resources of the company from the Year Planner to the plant's Production Scheduling.
- Weighted balance between market demands and the plant's production potential.
- Rapid and precise response to viability of meeting customer requests.
- The expected date of delivery will be determined promptly, taking into account all the intermediate stages of production. Inventory information will be taken into account in the arrival of new orders and in the reallocation of diverted orders.
- The automation of the Planning and Scheduling Systems will enable users to concentrate on tasks which are more critical and strategic to the company.
- The Production Scheduling of the whole plant will be fully integrated, from the Steelworks to the end of the Finishing Lines.
- Planning will automatically generate the formation and sequencing of campaigns.
- The Specification and Routing System will be sufficiently intelligent to release people from tedious manual processes. The specification process will consider standard and alternative routes.
- Application of material will be considered on entering orders. The process will be automatic and performed in real time. All the relevant aspects of matching orders with available materials will be considered.
- The total time between the placing of the order and its being shipped to the customer will be reduced.
- Planning and Scheduling will be continually adapted to the plant's conditions in order to exploit its capacities to the maximum and better service the market.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A system for scheduling operations in a steel mill, comprising:

means for reading all the orders that must be produced in a certain period of time and for creating the necessary number of slabs to satisfy the orders;

means for reading all the virtual slabs to be produced and their due dates as hot coils, and for generating an ideal rolling sequence of slabs;

means for reading an ideal rolling sequence of slabs and for generating a set of heats to be produced;

means for reading the real slabs to be produced, for generating a plurality of hot coil schedules, and for writing hot coil schedules into a hot coil schedule memory;

means for reading a plurality of solutions from the hot coil schedule memory, for extracting common parts from the plurality of solutions, and for using the extracted parts as an initial partial solution for a hot strip mill sequencing algorithm.

2. A system according to claim 1, wherein the means for reading all the orders includes means for generating an output identifying the number of slabs to be produced and their specifications.

3. A method for scheduling operations in a steel mill, comprising the steps:

reading all the orders that must be produced in a certain period of time, and creating the necessary number of slabs to satisfy the orders;

reading all the virtual slabs to be produced and their due dates as hot coils, and generating an ideal rolling sequence of slabs;

reading an ideal rolling sequence of slabs and generating a set of heats to be produced;

reading the real slabs to be produced, generating a plurality of hot coil schedules, and writing hot coil schedules into a hot coil schedule memory; and reading a plurality of solutions from the hot coil schedule memory, extracting common parts from the plurality of solutions, and using the extracted parts as an initial partial solution for a hot strip mill sequencing algorithm.

4. A method according to claim 3, wherein the step of reading all the orders includes generating an output identifying the number of slabs to be produced and their specifications.

5. A program storage device readable by machine, tangibly embodying a program of instructions executable by the machine to perform method steps for scheduling operations in a steel mill, the method steps comprising:

reading all the orders that must be produced in a certain period of time and creating the necessary number of slabs to satisfy the orders;

reading all the virtual slabs to be produced and their due dates as hot coils, and generating an ideal rolling sequence of slabs;

reading an ideal rolling sequence of slabs and generating a set of heats to be produced;

reading the real slabs to be produced, generating a plurality of hot coil schedules, and writing hot coil schedules into a hot coil schedule memory;

reading a plurality of solutions from the hot coil schedule memory, extracting common parts from the plurality of solutions, and using the extracted parts as an initial partial solution for a hot strip mill sequencing algorithm.

6. A program storage device according to claim 5, wherein the step of reading all the orders includes generating an output identifying the number of slids to be produced and their specifications.

7. A system for scheduling work orders in a plant, comprising:

means for grouping the orders into heats;

means for creating a reference list for the heats, from which the heats are pulled to be scheduled;

means for identify current plant conditions;

means for testing a best value of an objective function for taking B possible schedules of heats, where B is an internal parameter;

means for forming sequences of up to P heats to be scheduled in order, where P is an internal parameter;

means for identifying the best of said sequences, without any re-arranging of the heats, and fixing the first heat of the best sequence as scheduled, after testing a number of possibilities; and means for removing the fixed heat from the reference list.

8. A system according to claim 7, wherein said number of possibilities is approximately $B^P$.

9. A system according to claim 7, wherein each heat is provided with a route that describes the production steps that the heat has to go through.

10. A method for scheduling work orders in a plant, comprising the steps:

grouping the orders into heats;

creating a reference list for the heats, from which the heats are pulled to be scheduled;

identifying current plant conditions;

testing a best value of an objective function for taking B possible schedules of heats, where B is an internal parameter;

forming sequences of up to P heats, where P is an internal parameter;

identifying the best of said sequences and fixing the first heat of the sequence as scheduled, after testing a number of possibilities; and removing the fixed heat from the reference list.

11. A method according to claim 10, wherein said number of possibilities is approximately $B^P$.

12. A method according to claim 11, wherein each heat is provided with a route that describes the production steps that the heat has to go through.

13. A method for scheduling production processes in a plant, comprising the steps:

a) reading information regarding what the plant has done, and the situation of metallic units and processing units in the plant;

b) identifying what each processing unit will be doing with the metallic units;

c) reading the next step to be executed in the route assigned to each metallic unit;

d) assigning a virtual time indicator and increasing the virtual time until a metallic unit is released by a processing unit;

e) checking the next routing step of the metallic unit, and placing the metallic unit in the set of the processing units that can execute the step;

f) verifying if all the metallic units of the same type of the one just finished are complete;

g) if not all the metallic units are complete, then assigning the next metallic unit to the processing unit;

h) if all the metallic units are complete, then selecting, from among all the types of materials available for that processing unit, which one is the best type to go next;

i) defining the best order of the metallic units in the selected group;

j) assigning the first metallic unit to the processing unit; and k) evaluating the processing time of said first metallic unit.

14. A method according to claim 13, further including the step of increasing the virtual time to the next event, and repeating steps (f) through (k).

15. A system for scheduling production processes in a plant, comprising means means for reading information regarding what the plant has done, and the situation of metallic units and processing units in the plant;

means for identifying what each processing unit will be doing with the metallic units;

means for reading the next step to be executed in the route assigned to each metallic unit;

means for assigning a virtual time indicator and increasing the virtual time until a metallic unit is released by a processing unit;

means for checking the next routing step of the metallic unit, and placing the metallic unit in the set of the processing units that can execute the step;

means for verifying if all the metallic units of the same type of the one just finished are complete;

means for assigning the next metallic unit to the processing unit if not all the metallic units are complete;

means for selecting, from among all the types of materials available for that processing unit, which one is the best type to go next, if all the metallic units are complete;

means for defining the best order of the metallic units in the selected group;

means for assigning the first metallic unit to the processing unit; and means for evaluating the processing time of said first metallic unit.

16. A system according to claim 15, wherein the means for reading the next step to be executed include means for replicating the metallic units in the set of each processing unit that can execute the step.

17. A method for scheduling work in a hot strip mill, comprising the steps:

establishing conditions for all processing units in the host strip mill area and fir the available slabs in stock;

group the slabs with similar routes, and identifying the critical sequences for each route;

evaluating the buffer size of be last step of a non-critical sequence so that a minimum lot size is reached before starting a critical sequence;

selecting slabs to be assigned to the buffers;

scheduling slabs for the processing units in the non-critical and in the critical sequences; and if a conflict is detected, delaying the processing starting time of buffer to eliminate the conflict.

18. A method according to claim 17, wherein a critical sequence is a sequence of operations that has no wait time in-between any two operations of the sequence.

19. A system for scheduling work in a hot strip mill, comprising:

means for establishing conditions for all processing units in the host strip mill area and for the available slabs in stock;

means for grouping the slabs with similar routes, and for identifying the critical sequences for each route;

means for evaluating the buffer size of the last step of a non-critical sequence so that a minimum lot size is reached before starting a critical sequence;

means for selecting slabs to be assigned to the buffers;

means for scheduling slabs for the processing units in the non-critical and in the critical sequences; and means for delaying the processing starting time of buffer, if a conflict is detected, to eliminate the conflict.

20. A system according to claim 19, further comprising means for providing starting and finishing times that each slab is processed in each processing unit of its route.

* * * * *

Disclaimer 6,684,117 — Edson Bacin, Curitiba (BR); Claudio Nogueira de Meneses, San Paulo (BR); Pedro Sergio de Souza, Marietta, GA (US); Ivan Roquete Macedo, Cambui Campinas (BR); Wesley Elias Ribeiro, Jd. Proenca Campinas (BR). METHODS AND SYSTEMS FOR SCHEDULING WORK. Patent dated Jan. 27, 2004. Disclaimer filed Oct. 5, 2006, by the assignee, International Business Machines Corporation.

Hereby enters this disclaimer to all claims of said patent.

*(Official Gazette February 27, 2007)*